(12) United States Patent
Zhang et al.

(10) Patent No.: US 12,072,474 B2
(45) Date of Patent: Aug. 27, 2024

(54) CAMERA LENS GROUP INCLUDING SEVEN LENSES OF -+-++- OR -++--+- REFRACTIVE POWERS

(71) Applicant: ZHEJIANG SUNNY OPTICS CO., LTD., Yuyao Zhejiang (CN)

(72) Inventors: Xiaobin Zhang, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 514 days.

(21) Appl. No.: 17/199,585

(22) Filed: Mar. 12, 2021

(65) Prior Publication Data
US 2022/0163772 A1    May 26, 2022

(30) Foreign Application Priority Data

Nov. 20, 2020  (CN) .......................... 202011314497.6

(51) Int. Cl.
*G02B 13/00* (2006.01)
*G02B 9/62* (2006.01)
*G02B 9/64* (2006.01)

(52) U.S. Cl.
CPC ........... *G02B 13/0045* (2013.01); *G02B 9/62* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

| | | |
|---|---|---|
| 11,513,319 B2 | 11/2022 | Nitta |
| 11,531,187 B2 | 12/2022 | Geng et al. |
| 11,940,600 B2 | 3/2024 | Xu et al. |
| 2019/0227279 A1 | 7/2019 | Yang |
| 2021/0088755 A1 | 3/2021 | Nitta |
| 2021/0199933 A1* | 7/2021 | Wang ................. G02B 13/0045 |
| 2022/0066145 A1* | 3/2022 | Liao ........................ G02B 9/64 |

FOREIGN PATENT DOCUMENTS

| | | |
|---|---|---|
| CN | 108873253 A | 11/2018 |
| CN | 110221402 A | 9/2019 |
| CN | 111344618 A | 6/2020 |
| CN | 111665612 A | 9/2020 |
| CN | 111856725 A | 10/2020 |
| CN | 213423585 U | 6/2021 |
| JP | 2020144241 A | 9/2020 |

* cited by examiner

*Primary Examiner* — Wen Huang
(74) *Attorney, Agent, or Firm* — Norris McLaughlin, P.A.

(57) ABSTRACT

The present disclosure discloses a camera lens group including, sequentially from an object side to an image side along an optical axis, a first lens having negative refractive power, a convex object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having refractive power and a concave object-side surface; a sixth lens having positive refractive power, a convex object-side surface and a convex image-side surface; and a seventh lens having negative refractive power. A maximum field-of-view FOV of the camera lens group satisfies: FOV>133.0°. An amount of distortion of the camera lens group is below 25.0%.

19 Claims, 9 Drawing Sheets

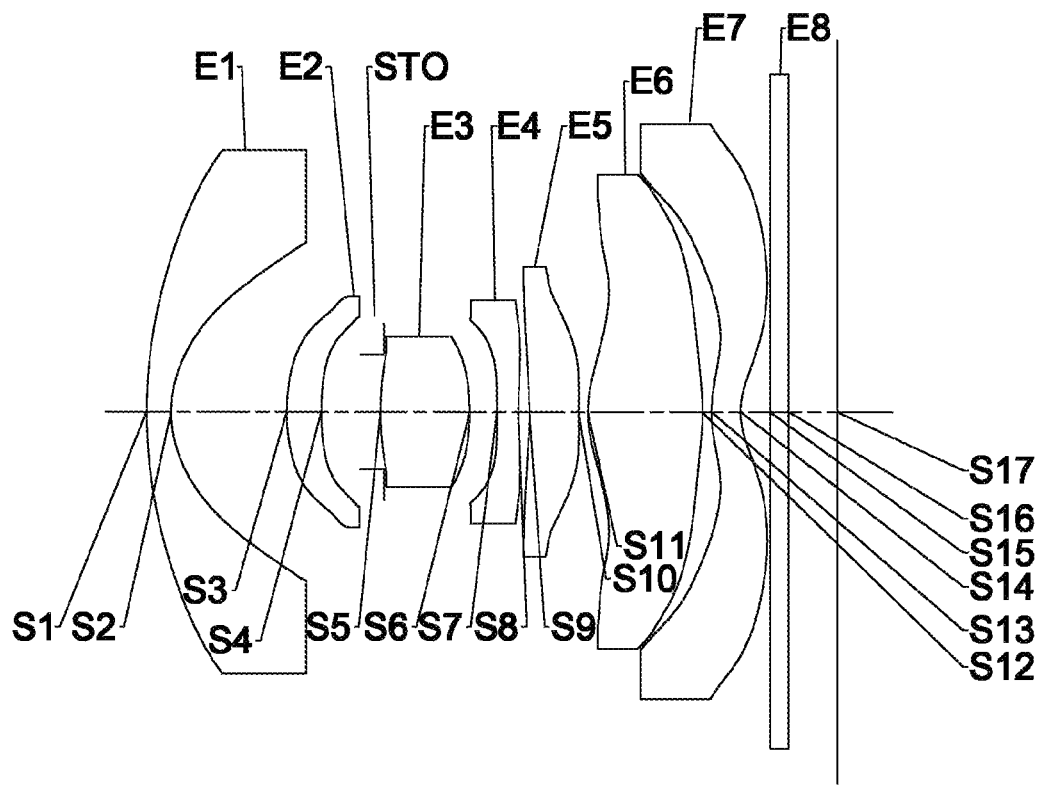
Fig. 9
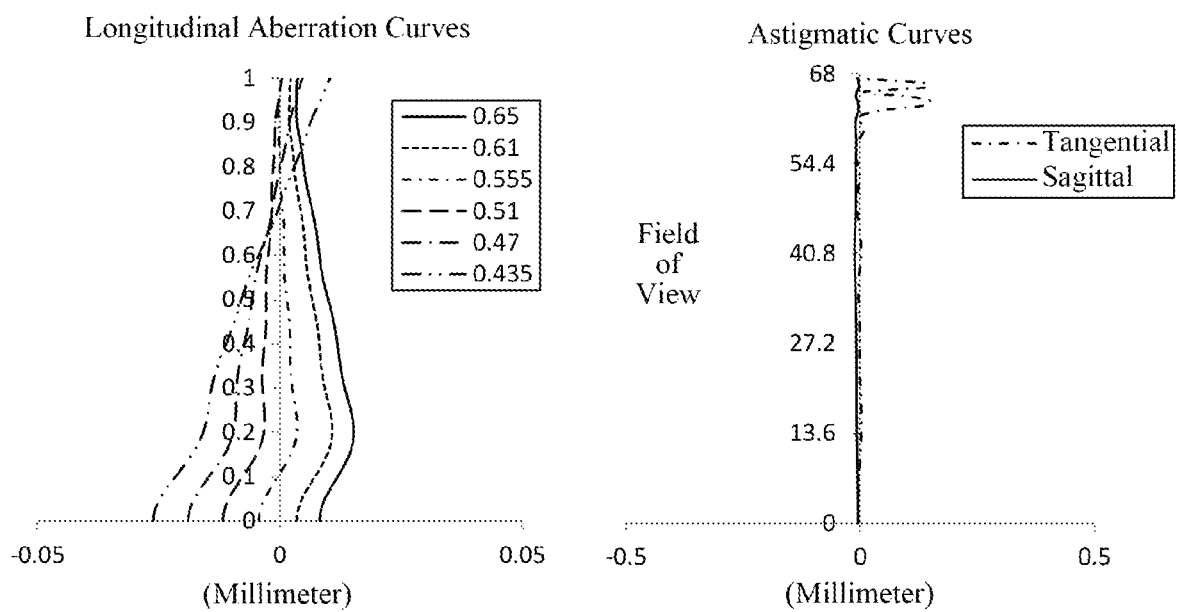
Fig. 10A
Fig. 10B

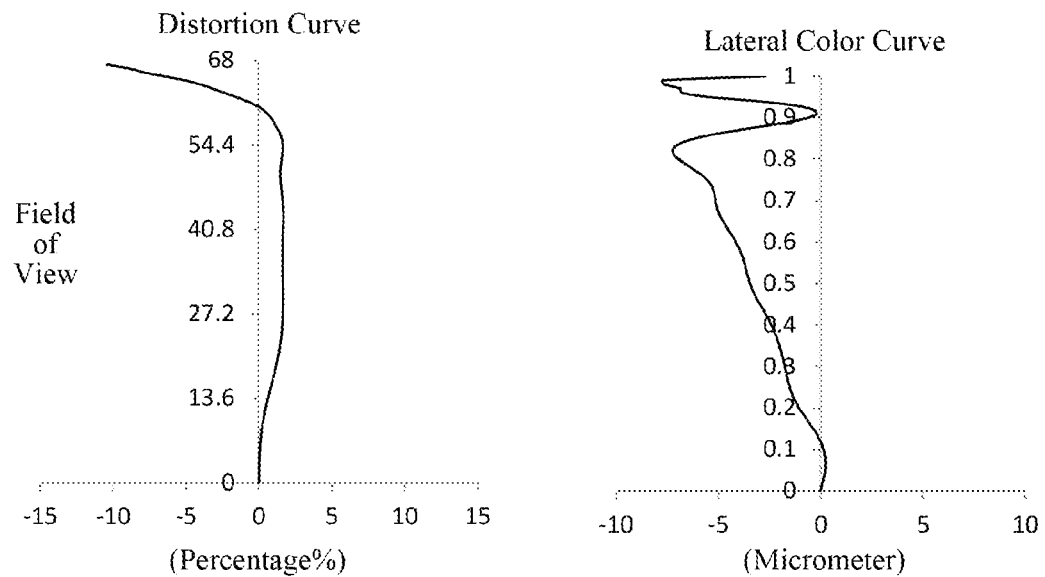
Fig. 10C
Fig. 10D
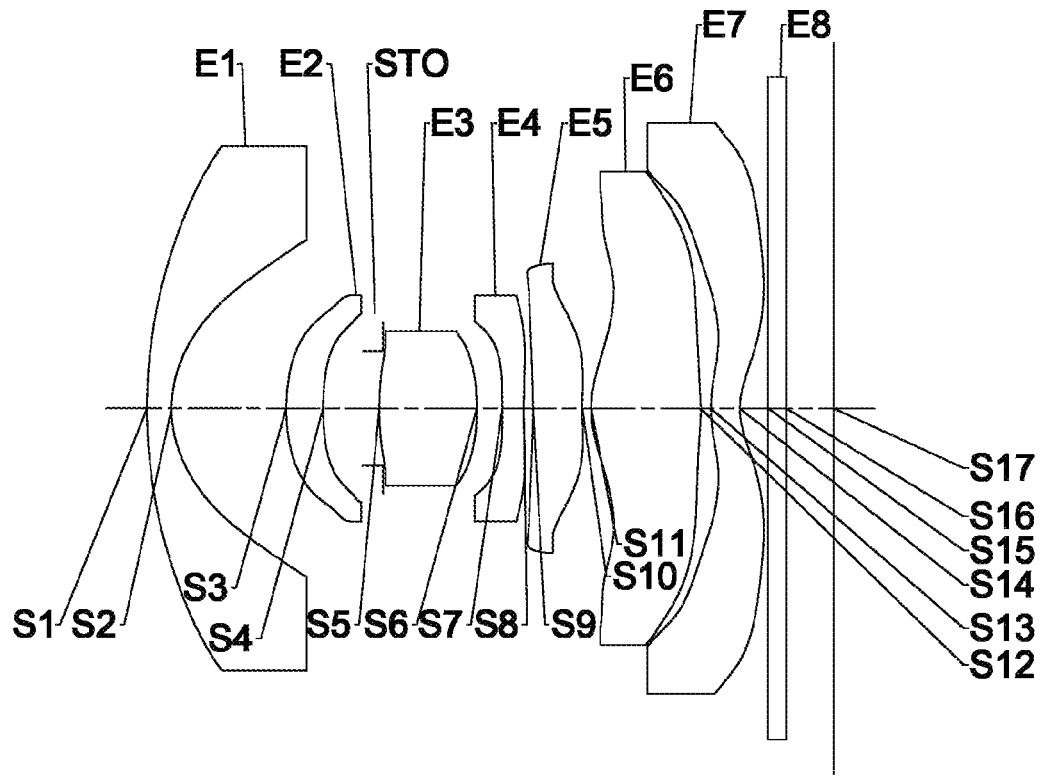
Fig. 11

CAMERA LENS GROUP INCLUDING SEVEN LENSES OF −+−++− OR −++−+− REFRACTIVE POWERS

CROSS-REFERENCE TO RELATED APPLICATION

This application claims benefit of priority to Chinese Patent Application No. 202011314497.6 filed on Nov. 20, 2020 before the China National Intellectual Property Administration, the entire disclosure of which is incorporated herein by reference in its entity.

TECHNICAL FIELD

The present disclosure relates to the field of optical elements, and specifically, relates to a camera lens group including seven lenses.

BACKGROUND

In recent years, camera lens groups for portable electronic products, such as mobile phones, have developed rapidly. By combining multiple lens assemblies, a high zoom ratio may be achieved, and thus perfect shooting may be performed in more scenes. Generally, in order to achieve a high zoom ratio, the field-of-view of the wide-angle camera lens group among the multiple lens assemblies needs to be as large as possible to ensure a short focal length. On the one hand, a large field-of-view lens assembly may collect more information about the object. On the other hand, the combination of a large field-of-view lens assembly and a telephoto lens assembly may be applied to more shooting scenes.

However, since the lens assembly with a large field-of-view usually has a large distortion, the captured image will be significantly deformed, which will result in the loss of image quality. In order to take into account both of the photographic quality and the field of view, and to reduce the number of lens assemblies (for example, using a lens assembly having wide-angle and small distortion to replace the main camera lens assembly), a camera lens with a large field-of-view and small distortion is required.

SUMMARY

In one aspect, the present disclosure provides a camera lens group which includes, sequentially from an object side to an image side along an optical axis, a first lens having negative refractive power, a convex object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having refractive power and a concave object-side surface; a sixth lens having positive refractive power, a convex object-side surface and a convex image-side surface; and a seventh lens having negative refractive power. A maximum field-of-view FOV of the camera lens group may satisfy: FOV>133.0°. An amount of distortion of the camera lens group may be controlled below 25.0%.

In some embodiments, an effective focal length f4 of the fourth lens and an effective focal length f1 of the first lens may satisfy: 0.50<f4/f1<4.50.

In some embodiments, a combined focal length f34 of the third lens and the fourth lens and a distance BFL from an image-side surface of the seventh lens to an imaging plane of the camera lens group along the optical axis may satisfy: 3.00<f34/BFL<4.50.

In some embodiments, a radius of curvature R3 of the object-side surface of the second lens and a radius of curvature R5 of the object-side surface of the third lens may satisfy: 2.00<(R3+R5)/(R5−R3)<6.00.

In some embodiments, a combined focal length f23 of the second lens and the third lens and a radius of curvature R5 of the object-side surface of the third lens may satisfy: 2.00<(f23+R5)/(R5−f23)<11.00.

In some embodiments, an effective focal length f1 of the first lens and a radius of curvature R6 of the image-side surface of the third lens may satisfy: 2.00<(f1+R6)/(f1−R6)<8.00.

In some embodiments, a center thickness CT6 of the sixth lens along the optical axis and a spaced interval T45 between the fourth lens and the fifth lens along the optical axis may satisfy: 3.00<CT6/T45<12.00.

In some embodiments, SAG21, being a distance along the optical axis from an intersection of the object-side surface of the second lens and the optical axis to a vertex of an effective radius of the object-side surface of the second lens, and SAG22, being a distance along the optical axis from an intersection of the image-side surface of the second lens and the optical axis to a vertex of an effective radius of the image-side surface of the second lens, may satisfy: 2.00<(SAG21+SAG22)/(SAG21−SAG22)<6.00.

In some embodiments, an edge thickness ET1 of the first lens and an edge thickness ET2 of the second lens may satisfy: 1.00<ET1/ET2<9.00.

In some embodiments, a maximum effective radius DT41 of an object-side surface of the fourth lens and a maximum effective radius DT42 of an image-side surface of the fourth lens may satisfy: 7.00<(DT41+DT42)/(DT42−DT41)<12.00.

In some embodiments, a maximum effective radius DT31 of the object-side surface of the third lens and a maximum effective radius DT32 of the image-side surface of the third lens may satisfy: 5.00<(DT31+DT32)/(DT32−DT31)<14.00.

In another aspect, the present disclosure provides a camera lens group which includes, sequentially from an object side to an image side along an optical axis, a first lens having negative refractive power, a convex object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having refractive power and a concave object-side surface; a sixth lens having positive refractive power, a convex object-side surface and a convex image-side surface; and a seventh lens having negative refractive power. A maximum field-of-view FOV of the camera lens group may satisfy: FOV>133.0°. A combined focal length f34 of the third lens and the fourth lens and a distance BFL from an image-side surface of the seventh lens to an imaging plane of the camera lens group along the optical axis may satisfy: 3.00<f34/BFL<4.50.

In some embodiments, an effective focal length f4 of the fourth lens and an effective focal length f1 of the first lens may satisfy: 0.50<f4/f1<4.50.

In some embodiments, a radius of curvature R3 of the object-side surface of the second lens and a radius of curvature R5 of the object-side surface of the third lens may satisfy: 2.00<(R3+R5)/(R5−R3)<6.00.

In some embodiments, a combined focal length f23 of the second lens and the third lens and a radius of curvature R5 of the object-side surface of the third lens may satisfy: $2.00<(f23+R5)/(R5-f23)<11.00$.

In some embodiments, an effective focal length f1 of the first lens and a radius of curvature R6 of the image-side surface of the third lens may satisfy: $2.00<(f1+R6)/(f1-R6)<8.00$.

In some embodiments, a center thickness CT6 of the sixth lens along the optical axis and a spaced interval T45 between the fourth lens and the fifth lens along the optical axis may satisfy: $3.00<CT6/T45<12.00$.

In some embodiments, SAG21, being a distance along the optical axis from an intersection of the object-side surface of the second lens and the optical axis to a vertex of an effective radius of the object-side surface of the second lens, and SAG22, being a distance along the optical axis from an intersection of the image-side surface of the second lens and the optical axis to a vertex of an effective radius of the image-side surface of the second lens, may satisfy: $2.00<(SAG21+SAG22)/(SAG21-SAG22)<6.00$.

In some embodiments, an edge thickness ET1 of the first lens and an edge thickness ET2 of the second lens may satisfy: $1.00<ET1/ET2<9.00$.

In some embodiments, a maximum effective radius DT41 of an object-side surface of the fourth lens and a maximum effective radius DT42 of an image-side surface of the fourth lens may satisfy: $7.00<(DT41+DT42)/(DT42-DT41)<12.00$.

In some embodiments, a maximum effective radius DT31 of the object-side surface of the third lens and a maximum effective radius DT32 of the image-side surface of the third lens may satisfy: $5.00<(DT31+DT32)/(DT32-DT31)<14.00$.

In some embodiments, the amount of distortion of the camera lens group may be controlled below 25.0%.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 9 illustrates a schematic structural view of a camera lens group according to example 5 of the present disclosure;

FIGS. 10A to 10D illustrate longitudinal aberration curves, astigmatic curves, a distortion curve, and a lateral color curve of the camera lens group of the example 5, respectively;

FIG. 11 illustrates a schematic structural view of a camera lens group according to example 6 of the present disclosure.

DETAILED DESCRIPTION OF EMBODIMENTS

Figure 1:
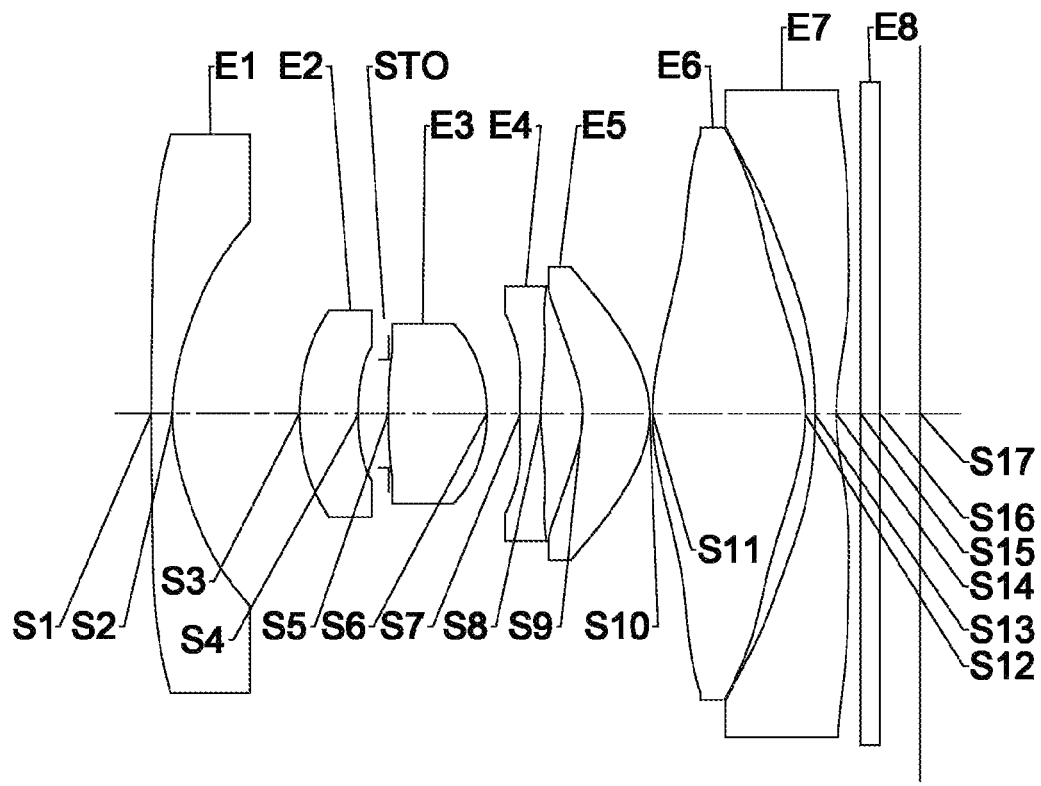
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include seven lenses having refractive power, which are a first lens, a second lens, a third lens, a fourth lens, a fifth lens, a sixth lens and a seventh lens. The first to the seventh lenses are arranged sequentially from an object side to an image side along an optical axis of the camera lens group, and there may be a spaced interval between each two adjacent lenses.

In an exemplary embodiment, the first lens may have negative refractive power, an object-side surface thereof may be convex, and an image-side surface thereof may be concave; the second lens may have refractive power, an object-side surface thereof may be convex, and an image-side surface thereof may be concave; the third lens may have positive refractive power, an object-side surface thereof may be convex, and an image-side surface thereof may be convex; the fourth lens may have refractive power; the fifth lens may have refractive power, and an object-side surface thereof may be concave; the sixth lens may have positive refractive power, an object-side surface thereof may be convex, and an image-side surface thereof may be convex; and the seventh lens may have negative refractive power.

In an exemplary embodiment, the camera lens group according to the present disclosure may satisfy: FOV>133.0°, where FOV is a maximum field-of-view of the camera lens group. More specifically, FOV may satisfy: 133.0°<FOV<140.0°. Satisfying FOV>133.0° may make the camera lens group have a large field-of-view.

In an exemplary embodiment, the amount of distortion of the camera lens group according to the present disclosure may be controlled below 25.0%, so that the camera lens group has good image quality. By keeping the field-of-view greater than 133 degrees and controlling the distortion below 25%, the camera lens group may have both a large field-of-view and small distortion. It should be noted that the amount of distortion of the camera lens group controlled below 25.0% means that, in any field of view, the distortion of the camera lens group is less than 25.0%. In other words, the maximum distortion of the camera lens group does not exceed 25.0%.

In an exemplary embodiment, the camera lens group according to the present disclosure may satisfy: 0.50<f4/f1<4.50, where f4 is an effective focal length of the fourth lens, and f1 is an effective focal length of the first lens. More specifically, f4 and f1 may further satisfy: 1.90<f4/f1<4.30. Satisfying 0.50<f4/f1<4.50 may effectively control the spherical aberration generated by the first lens and the fourth lens, thereby correcting the spherical aberration of the lens group.

In an exemplary embodiment, the camera lens group according to the present disclosure may satisfy: 3.00<f34/BFL<4.50, where f34 is a combined focal length of the third lens and the fourth lens, and BFL is a distance from an image-side surface of the seventh lens to an imaging plane of the camera lens group along the optical axis. More specifically, f34 and BFL may further satisfy: 3.00<f34/BFL<3.80. The third lens and the fourth lens may be regarded as a double cemented lens. By reasonably controlling the ratio of the combined focal length of the third lens and the fourth lens to the back focal length, the chromatic aberration of the camera lens group may be effectively corrected.

In an exemplary embodiment, the camera lens group according to the present disclosure may satisfy: 2.00<(R3+R5)/(R5−R3)<6.00, where R3 is a radius of curvature of the object-side surface of the second lens, and R5 is a radius of curvature of the object-side surface of the third lens. Satisfying 2.00<(R3+R5)/(R5−R3)<6.00 is beneficial to optimizing the shape of the second lens and the third lens, thereby facilitating molding of the lenses.

In an exemplary embodiment, the camera lens group according to the present disclosure may satisfy: 2.00<(f23+R5)/(R5−f23)<11.00, where f23 is a combined focal length of the second lens and the third lens, and R5 is a radius of curvature of the object-side surface of the third lens. More specifically, f23 and R5 may satisfy: 2.20<(f23+R5)/(R5−f23)<9.00. Satisfying 2.00<(f23+R5)/(R5−f23)<11.00 may effectively control the refractive power of adjacent lenses while ensuring the shape of the third lens. In addition, it is beneficial to compensate the loss of performance of the third lens by the second lens, thereby improving the overall performance of the camera lens group.

In an exemplary embodiment, the camera lens group according to the present disclosure may satisfy: 2.00<(f1+R6)/(f1−R6)<8.00, where f1 is an effective focal length of the first lens, and R6 is a radius of curvature of the image-side surface of the third lens. With this configuration, the first lens may effectively converge the light incident to the camera lens group. At the same time, by controlling the curvature of the third lens, the travelling direction of the light may be further controlled, which is beneficial to improve the relative illumination of the camera lens group.

In an exemplary embodiment, the camera lens group according to the present disclosure may satisfy: 3.00<CT6/T45<12.00, where CT6 is a center thickness of the sixth lens along the optical axis, and T45 is a spaced interval between the fourth lens and the fifth lens along the optical axis. Satisfying 3.00<CT6/T45<12.00 may effectively restrict the position of each lens, thus facilitating the overall arrangement of the camera lens group. Further, CT6 and T45 may satisfy 3.50<CT6/T45<12.00.

In an exemplary embodiment, the camera lens group according to the present disclosure may satisfy: 2.00<(SAG21+SAG22)/(SAG21−SAG22)<6.00, where SAG21 is a distance along the optical axis from an intersection of the object-side surface of the second lens and the optical axis to a vertex of an effective radius of the object-side surface of the second lens, and SAG22 is a distance along the optical axis from an intersection of the image-side surface of the second lens and the optical axis to a vertex of an effective radius of the image-side surface of the second lens. More specifically, SAG21 and SAG22 may satisfy: 2.50<(SAG21+SAG22)/(SAG21−SAG22)<5.20. By controlling the vector height of the image-side surface of the second lens and the vector height of the object-side surface of the second lens, it is beneficial to constrain the shape of the second lens, and reasonably control the aperture angle of the second lens, thereby improving the manufacturability of the lens. In addition, by reasonably restricting the lens shape of the second lens, the risk of ghosting caused by the second lens may be effectively reduced.

In an exemplary embodiment, the camera lens group according to the present disclosure may satisfy: 7.00<(DT41+DT42)/(DT42−DT41)<12.00, where DT41 is a maximum effective radius of an object-side surface of the fourth lens, and DT42 is a maximum effective radius of an image-side surface of the fourth lens. On the one hand, satisfying 7.00<(DT41+DT42)/(DT42−DT41)<12.00 is beneficial to reducing the break difference (that is, the difference between the lens diameter of the third lens and the lens diameter of the fourth lens) between the third lens and the fourth lens. On the other hand, it is beneficial to control the edge tendency of the image-side surface of the fourth lens to avoid recursion. More specifically, DT41 and DT42 may satisfy: 8.00<(DT41+DT42)/(DT42−DT41)<12.00.

In an exemplary embodiment, the camera lens group according to the present disclosure may satisfy: 5.00<(DT31+DT32)/(DT32−DT31)<14.00, where DT31 is a maximum effective radius of the object-side surface of the third lens, and DT32 is a maximum effective radius of the image-side surface of the third lens. On the one hand, satisfying 5.00<(DT31+DT32)/(DT32−DT31)<14.00 is beneficial to controlling the travelling direction of the light to correct the aberration of the camera lens group. On the other hand, it is also beneficial to reduce the sensitivity of the third lens, thereby improving the production yield of the camera lens group. For example, DT31 and DT32 may satisfy: 5.50<(DT31+DT32)/(DT32−DT31)<13.50.

In an exemplary embodiment, the camera lens group according to the present disclosure may satisfy: 1.00<ET1/ET2<9.00, where ET1 is an edge thickness of the first lens, and ET2 is an edge thickness of the second lens. Satisfying 1.00<ET1/ET2<9.00 is conducive to reducing the size of the camera lens group and making the camera lens group have good workability.

In an exemplary embodiment, the camera lens group according to the present disclosure may further include a stop disposed between the second lens and the third lens. Optionally, the above camera lens group further includes an optical filter for correcting the color deviation and/or a protective glass for protecting the photosensitive element located on an imaging plane.

The camera lens group according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size of the camera lens group may be effectively reduced, and the workability of the camera lens group may be improved, such that the camera lens group is more advantageous for production processing and may be applied to portable electronic products. The camera lens group configured as described above may have characteristics such as large field-of-view, small distortion, and good image quality.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking seven lenses as an example, the camera lens group is not limited to include seven lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 22.1136 | 0.2426 | 1.55 | 56.1 | −4.78 | 0.0000 |
| S2 | Aspheric | 2.3258 | 1.4507 | | | | 0.0000 |
| S3 | Aspheric | 2.6777 | 0.6692 | 1.67 | 19.0 | 20.50 | 0.0000 |
| S4 | Aspheric | 2.9840 | 0.3503 | | | | 0.0000 |
| STO | Spherical | Infinite | −0.0065 | | | | |
| S5 | Aspheric | 6.9846 | 1.1249 | 1.55 | 56.1 | 2.80 | 0.0000 |
| S6 | Aspheric | −1.8465 | 0.3757 | | | | 0.0000 |
| S7 | Aspheric | 5.0488 | 0.2426 | 1.68 | 19.2 | −9.84 | 0.0000 |
| S8 | Aspheric | 2.8171 | 0.4768 | | | | 0.0000 |
| S9 | Aspheric | −1.2388 | 0.7628 | 1.55 | 56.1 | 10.49 | −1.0000 |
| S10 | Aspheric | −1.2399 | 0.0347 | | | | −1.0000 |
| S11 | Aspheric | 2.7154 | 1.7405 | 1.54 | 56.0 | 2.57 | −1.0000 |
| S12 | Aspheric | −2.2547 | 0.1124 | | | | −1.0000 |
| S13 | Aspheric | −5.6843 | 0.2426 | 1.67 | 19.0 | −2.64 | 0.0000 |
| S14 | Aspheric | 2.6441 | 0.0347 | | | | −1.0000 |
| S15 | Spherical | Infinite | 0.2426 | 1.52 | 64.2 | | |
| S16 | Spherical | Infinite | 0.6815 | | | | |
| S17 | Spherical | Infinite | | | | | |

In this example, a total effective focal length f of the camera lens group is 2.08 mm, a total length TTL of the camera lens group (that is, a distance along the optical axis from the object-side surface S1 of the first lens E1 to the imaging plane S17 of the camera lens group) is 8.78 mm, half of a diagonal length ImgH of an effective pixel area on the imaging plane S17 of the camera lens group is 4.20 mm, an aperture value Fno of the camera lens group is 2.20, and half of a maximum field-of-view Semi-FOV of the camera lens group is 67.44°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 and Table 3 show high-order coefficients A4, A6, A8, A10, A12, A14, A16, A18, A20, A22, A24, A26 and A28 applicable to each aspheric surface S1 to S14 in example 1.

TABLE 2

| Surface number | A4 | A6 | A8 | A10 | A12 | A14 | A16 |
|---|---|---|---|---|---|---|---|
| S1 | −1.3569E−02 | 4.1490E−03 | −5.8071E−04 | 4.7214E−05 | −2.1320E−06 | 3.9888E−08 | 1.1027E−10 |
| S2 | −3.6714E−02 | −1.8027E−02 | 9.3691E−03 | −9.8414E−03 | 6.8829E−03 | −3.1385E−03 | 9.1122E−04 |
| S3 | 2.3791E−02 | −3.8989E−04 | 3.7173E−02 | −5.9683E−02 | 5.0260E−02 | −2.1685E−02 | 1.7794E−03 |
| S4 | 1.0881E−01 | 8.9334E−02 | −2.3055E−01 | 9.5076E−01 | −1.8910E+00 | 1.8665E+00 | −7.1042E−01 |
| S5 | 2.2692E−02 | 1.4194E−03 | 1.2527E−01 | −1.4644E+00 | 6.1851E+00 | −1.2172E+01 | 9.1054E+00 |
| S6 | −9.0684E−02 | 1.2952E−01 | −2.0387E−01 | 2.1871E−01 | −1.6764E−01 | 5.7253E−02 | 3.1349E−03 |
| S7 | −3.5882E−01 | 2.3513E−01 | −2.2333E−01 | 3.4342E−01 | −3.0430E−01 | 1.2560E−01 | −1.8985E−02 |
| S8 | −2.6744E−01 | 2.0447E−01 | −1.5135E−01 | 1.0902E−01 | −4.8561E−02 | 1.0810E−02 | −9.1057E−04 |
| S9 | 2.2325E−01 | −7.4938E−02 | 2.6321E−02 | −6.5435E−02 | 5.7591E−02 | −1.9040E−02 | 2.1462E−03 |
| S10 | 2.8912E−02 | 1.0519E−02 | 6.0638E−02 | −3.9976E−03 | −8.5993E−04 | 1.6059E−03 | −9.7711E−04 |
| S11 | −5.0849E−02 | 1.6544E−02 | −4.5954E−03 | 7.7223E−04 | −7.1454E−05 | 3.3343E−06 | −5.5387E−08 |
| S12 | 4.8791E−02 | −1.3772E−02 | 4.1440E−03 | −7.9220E−04 | 8.0384E−05 | −3.9366E−06 | 6.8386E−08 |
| S13 | −1.0614E−02 | −3.3922E−03 | 3.2320E−03 | −7.4193E−04 | 7.6228E−05 | −3.5235E−06 | 4.5072E−08 |
| S14 | −9.8027E−02 | 2.6898E−02 | −4.3742E−03 | 4.3404E−04 | −2.6082E−05 | 8.7751E−07 | −1.2693E−08 |

TABLE 3

| Surface number | A18 | A20 | A22 | A24 | A26 | A28 |
|---|---|---|---|---|---|---|
| S1 | 0.0000E+00 | 0.0000E+00 | 0.0000E+00 | 0.0000E+00 | 0.0000E+00 | 0.0000E+00 |
| S2 | −1.6300E−04 | 1.6376E−05 | −7.0848E−07 | 0.0000E+00 | 0.0000E+00 | 0.0000E+00 |
| S3 | 8.2019E−04 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 |
| S6 | −5.7468E−03 | 0.0000E+00 | 0.0000E+00 | 0.0000E+00 | 0.0000E+00 | 0.0000E+00 |

TABLE 3-continued

| Surface number | A18 | A20 | A22 | A24 | A26 | A28 |
|---|---|---|---|---|---|---|
| S7 | −6.0068E−04 | −1.0538E−04 | 0.0000E+00 | 0.0000E+00 | 0.0000E+00 | 0.0000E+00 |
| S8 | −1.9430E−06 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 |
| S10 | 6.6904E−04 | −3.5655E−04 | 1.2815E−04 | −3.0280E−05 | 4.2285E−06 | −2.7002E−07 |
| S11 | −3.8811E−10 | 0.0000E+00 | 0.0000E+00 | 0.0000E+00 | 0.0000E+00 | 0.0000E+00 |
| S12 | −1.0818E−10 | 2.8748E−11 | 0.0000E+00 | 0.0000E+00 | 0.0000E+00 | 0.0000E+00 |
| S13 | 9.2872E−10 | −1.9506E−11 | 9.5842E−13 | 0.0000E+00 | 0.0000E+00 | 0.0000E+00 |
| S14 | 0.0000E+00 | 0.0000E+00 | 0.0000E+00 | 0.0000E+00 | 0.0000E+00 | 0.0000E+00 |

Figures 2A, 2B:
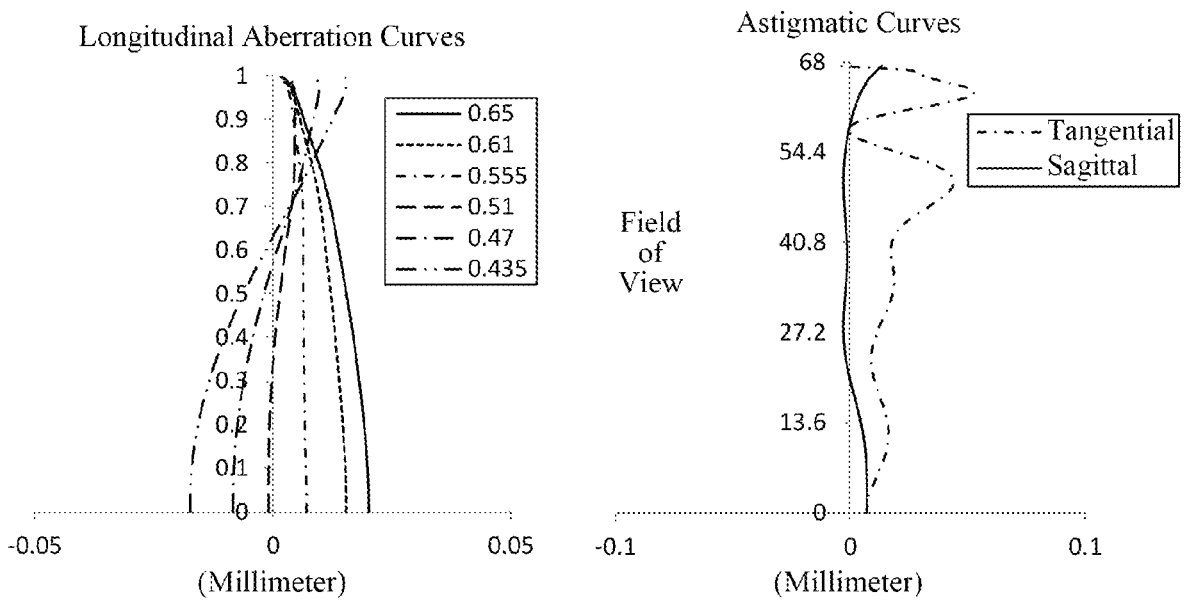
FIGS. 2A to 2D illustrate longitudinal aberration curves, astigmatic curves, a distortion curve, and a lateral color curve of the camera lens group of the example 1, respectively.
Figure 2C:
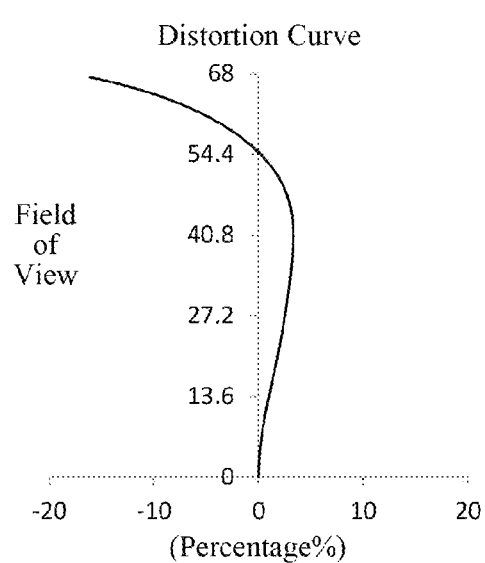
Figure 2D:
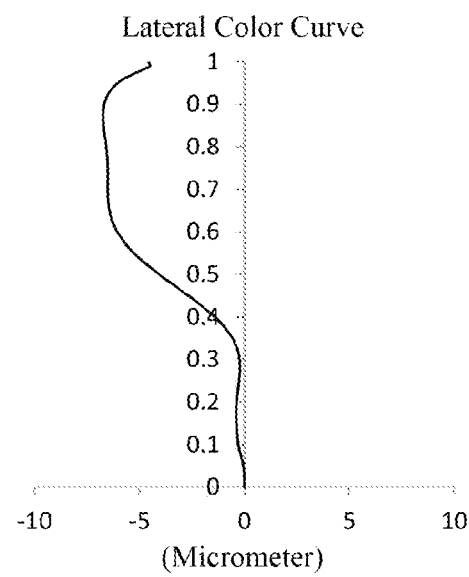

FIG. 2A illustrates longitudinal aberration curves of the camera lens group according to example 1, representing the deviations of focal points converged by light of different wavelengths after passing through the lens group. FIG. 2B illustrates astigmatic curves of the camera lens group according to example 1, representing the curvatures of a tangential plane and the curvatures of a sagittal plane. FIG. 2C illustrates a distortion curve of the camera lens group according to example 1, representing the amounts of distortion corresponding to different field-of-views. FIG. 2D illustrates a lateral color curve of the camera lens group according to example 1, representing the deviations of different image heights on an imaging plane after light passes through the lens group. It can be seen from FIG. 2A to FIG. 2D that the camera lens group provided in example 1 may achieve good image quality.

Example 2

Figure 3:
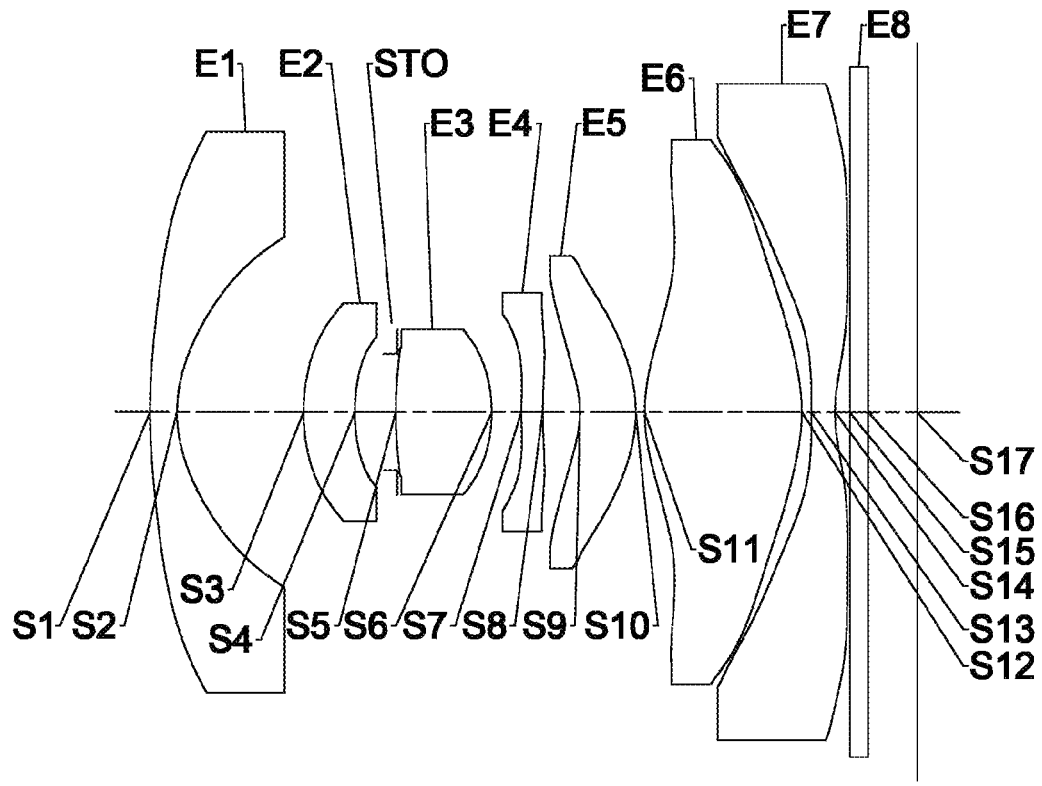
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is convex. The sixth lens E6 has positive refractive power, an object-side surface S11 thereof is convex, and an image-side surface S12 thereof is convex. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the camera lens group is 2.07 mm, a total length TTL of the camera lens group is 8.76 mm, half of a diagonal length ImgH of an effective pixel area on the imaging plane S17 of the camera lens group is 4.20 mm, an aperture value Fno of the camera lens group is 2.20, and half of a maximum field-of-view Semi-FOV of the camera lens group is 68.46°.

Table 4 illustrates basic parameters of the camera lens group of example 2, wherein the units for the radius of curvature, the thickness/distance and the focal length are millimeter (mm). Table 5 and Table 6 show high-order coefficients A4, A6, A8, A10, A12, A14, A16, A18, A20, A22, A24 and A26 applicable to each aspheric surface S1 to S14 in example 2, wherein the surface shape of each aspheric surface may be defined by the formula (1) given in the above example 1.

TABLE 4

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 7.5622 | 0.3081 | 1.55 | 56.1 | −3.99 | −0.7021 |
| S2 | Aspheric | 1.6674 | 1.4441 | | | | −1.0000 |
| S3 | Aspheric | 2.2358 | 0.5867 | 1.66 | 19.7 | 23.11 | 0.0261 |
| S4 | Aspheric | 2.3398 | 0.4851 | | | | −0.0270 |
| STO | Spherical | Infinite | −0.0181 | | | | |
| S5 | Aspheric | 5.0459 | 1.0951 | 1.55 | 56.1 | 2.58 | 1.9160 |
| S6 | Aspheric | −1.8056 | 0.3393 | | | | 0.0076 |
| S7 | Aspheric | 7.6930 | 0.2425 | 1.68 | 19.2 | −16.79 | 0.1082 |
| S8 | Aspheric | 4.5308 | 0.4264 | | | | −99.0000 |
| S9 | Aspheric | −1.1863 | 0.6372 | 1.55 | 56.1 | −15.02 | −1.0000 |
| S10 | Aspheric | −1.6501 | 0.1000 | | | | −1.0000 |
| S11 | Aspheric | 1.9186 | 1.7955 | 1.52 | 64.0 | 2.26 | −5.4133 |
| S12 | Aspheric | −2.0447 | 0.1103 | | | | −1.0000 |
| S13 | Aspheric | −20.0459 | 0.2675 | 1.67 | 19.0 | −2.49 | −0.1055 |

TABLE 4-continued

| Surface number | Surface type | Radius of curvature | Thickness/ Distance | Material Refractive index | Abbe number | Focal length | Conic coefficient |
|---|---|---|---|---|---|---|---|
| S14 | Aspheric | 1.8490 | 0.1703 | | | | −1.0000 |
| S15 | Spherical | Infinite | 0.2100 | 1.52 | 64.2 | | |
| S16 | Spherical | Infinite | 0.5600 | | | | |
| S17 | Spherical | Infinite | | | | | |

TABLE 5

| Surface number | A4 | A6 | A8 | A10 | A12 | A14 |
|---|---|---|---|---|---|---|
| S1 | −1.0534E−04 | −1.2803E−02 | 1.0533E−02 | −4.7309E−03 | 1.4195E−03 | −2.9999E−04 |
| S2 | −1.7530E−03 | −2.0454E−02 | 1.4742E−02 | −9.7315E−03 | 1.3527E−02 | −1.3858E−02 |
| S3 | 2.6205E−02 | −2.0063E−02 | 1.7924E−01 | −7.0481E−01 | 1.9190E+00 | −3.6481E+00 |
| S4 | 1.0674E−01 | −9.2066E−02 | 2.1353E+00 | −2.0079E−01 | 1.2523E+02 | −5.2619E+02 |
| S5 | −7.3601E−02 | 3.2392E+00 | −7.4733E+01 | 1.0295E+03 | −9.1865E+03 | 5.5352E+04 |
| S6 | −1.0387E−01 | 3.5847E−02 | 4.7265E−01 | −3.7930E+00 | 1.8249E+01 | −6.1862E+01 |
| S7 | −2.7404E−01 | −1.8421E−01 | 1.2277E+00 | −4.3945E+00 | 1.2766E+01 | −2.7369E+01 |
| S8 | 1.7667E−02 | −5.4554E−01 | 1.6649E+00 | −3.6706E+00 | 6.3833E+00 | −8.4637E+00 |
| S9 | 4.3113E−01 | −5.5478E−01 | 8.7154E−01 | −1.3527E+00 | 1.7078E+00 | −1.6892E+00 |
| S10 | 7.1957E−02 | −1.0130E−01 | 1.4079E−01 | −1.6903E−01 | 1.8821E−01 | −1.7389E−01 |
| S11 | −2.6074E−02 | 9.4531E−03 | −8.6086E−03 | 7.1543E−03 | −4.1638E−03 | 1.5782E−03 |
| S12 | 1.2559E−01 | −7.3717E−02 | 1.7449E−02 | 5.8785E−03 | −5.7330E−03 | 2.0303E−03 |
| S13 | −1.1773E−01 | 5.0898E−02 | −1.5244E−02 | 6.9073E−03 | −3.3075E−03 | 1.0747E−03 |
| S14 | −2.2874E−01 | 1.1962E−01 | −4.5281E−02 | 1.3239E−02 | −2.9905E−03 | 5.0923E−04 |

TABLE 6

| Surface number | A16 | A18 | A20 | A22 | A24 | A26 |
|---|---|---|---|---|---|---|
| S1 | 4.5332E−05 | −4.8764E−06 | 3.6504E−07 | −1.8093E−08 | 5.3433E−10 | −7.1263E−12 |
| S2 | 8.5060E−03 | −3.2424E−03 | 7.7754E−04 | −1.1372E−04 | 9.2011E−06 | −3.1247E−07 |
| S3 | 4.8725E+00 | −4.5490E+00 | 2.9007E+00 | −1.2015E+00 | 2.9069E−01 | −3.1114E−02 |
| S4 | 1.5142E+03 | −2.9867E+03 | 3.9668E+03 | −3.3882E+03 | 1.6796E+03 | −3.6697E+02 |
| S5 | −2.2970E+05 | 6.5775E+05 | −1.2768E+06 | 1.6045E+06 | −1.1777E+06 | 3.8339E+05 |
| S6 | 1.4873E+02 | −2.5032E+02 | 2.8672E+02 | −2.1207E+02 | 9.1098E+01 | −1.7235E+01 |
| S7 | 4.2079E+01 | −4.5661E+01 | 3.3968E+01 | −1.6422E+01 | 4.6365E+00 | −5.7941E−01 |
| S8 | 8.3258E+00 | −5.9158E+00 | 2.9281E+00 | −9.5287E−01 | 1.8263E−01 | −1.5589E−02 |
| S9 | 1.2811E+00 | −7.1440E−01 | 2.7851E−01 | −7.1215E−02 | 1.0692E−02 | −7.1352E−04 |
| S10 | 1.1696E−01 | −5.4416E−02 | 1.7132E−02 | −3.5018E−03 | 4.2016E−04 | −2.2457E−05 |
| S11 | −3.9239E−04 | 6.4990E−05 | −7.1421E−06 | 5.0189E−07 | −2.0456E−08 | 3.6812E−10 |
| S12 | −4.2615E−04 | 5.8140E−05 | −5.2333E−06 | 3.0133E−07 | −1.0099E−08 | 1.5042E−10 |
| S13 | −2.2707E−04 | 3.1703E−05 | −2.9163E−06 | 1.7042E−07 | −5.7432E−09 | 8.5085E−11 |
| S14 | −6.3744E−05 | 5.7204E−06 | −3.5602E−07 | 1.4544E−08 | −3.5003E−10 | 3.7557E−12 |

Figure 4A:
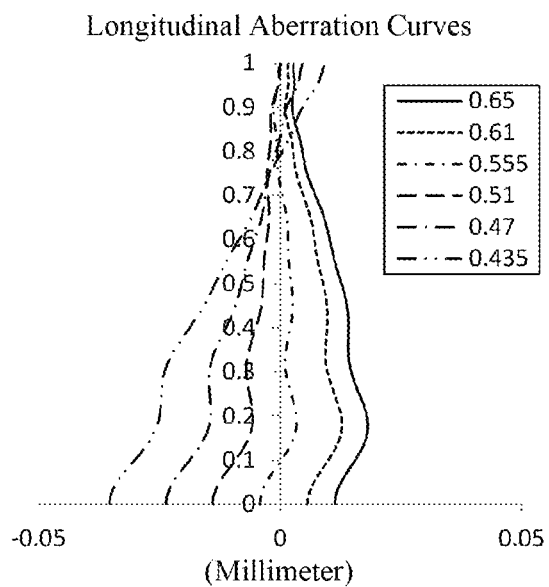
FIGS. 4A to 4D illustrate longitudinal aberration curves, astigmatic curves, a distortion curve, and a lateral color curve of the camera lens group of the example 2, respectively.
Figure 4B:
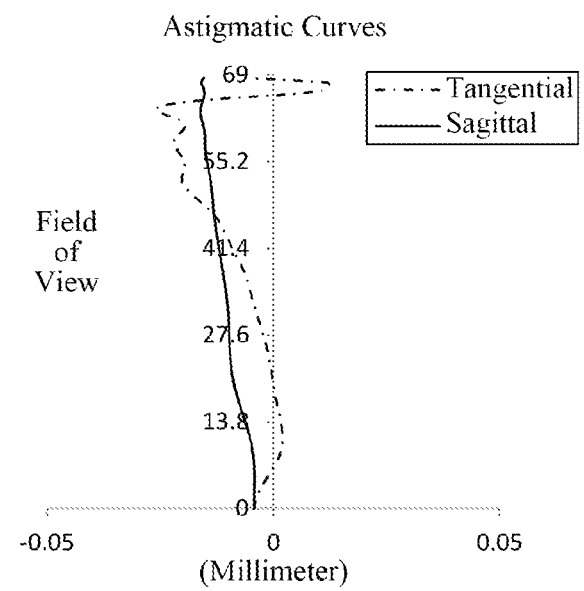
Figure 4C:
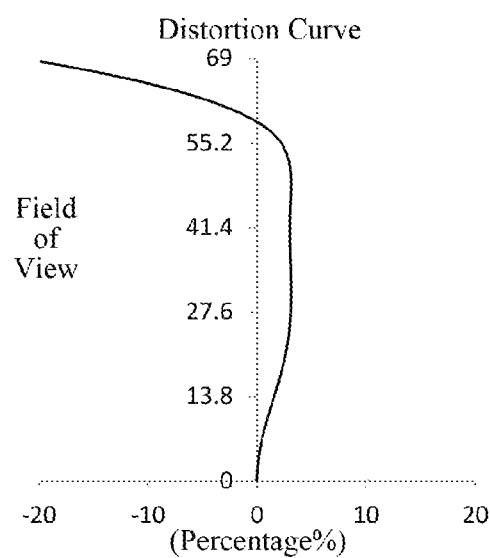
Figure 4D:
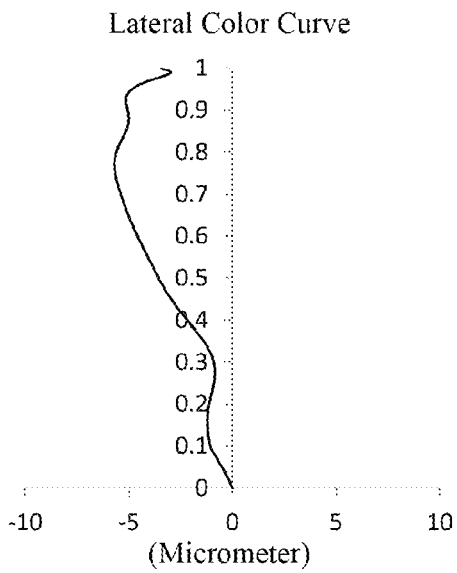

FIG. 4A illustrates longitudinal aberration curves of the camera lens group according to example 2, representing the deviations of focal points converged by light of different wavelengths after passing through the lens group. FIG. 4B illustrates astigmatic curves of the camera lens group according to example 2, representing the curvatures of a tangential plane and the curvatures of a sagittal plane. FIG. 4C illustrates a distortion curve of the camera lens group according to example 2, representing the amounts of distortion corresponding to different field-of-views. FIG. 4D illustrates a lateral color curve of the camera lens group according to example 2, representing the deviations of different image heights on an imaging plane after light passes through the lens group. It can be seen from FIG. 4A to FIG. 4D that the camera lens group provided in example 2 may achieve good image quality.

Example 3

Figure 5:
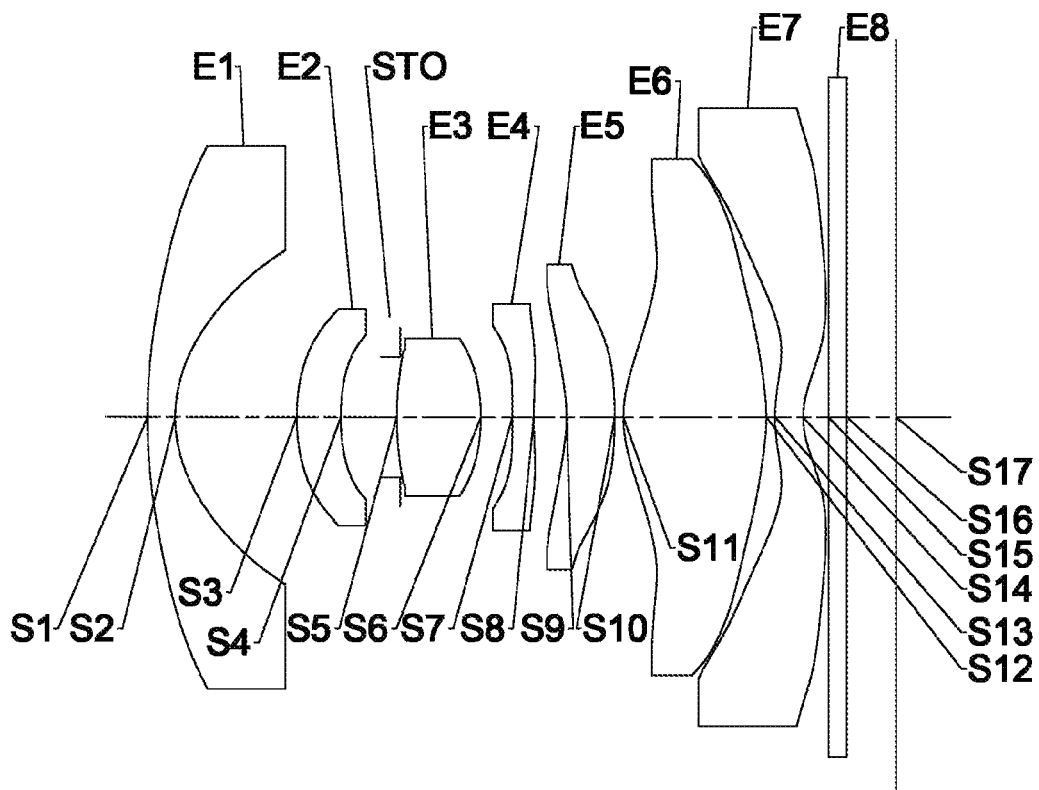
FIG. 5 illustrates a schematic structural view of a camera lens group according to example 3 of the present disclosure.

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is convex. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the camera lens group is 2.07 mm, a total length TTL of the camera lens group is 8.54 mm, half of a diagonal length ImgH of an effective pixel area on the imaging plane S17 of the camera lens group is 4.20 mm, an aperture value Fno of the camera lens group is 2.20, and half of a maximum field-of-view Semi-FOV of the camera lens group is 68.55°.

Table 7 illustrates basic parameters of the camera lens group of example 3, wherein the units for the radius of curvature, the thickness/distance and the focal length are millimeter (mm). Table 8 and Table 9 show high-order coefficients A4, A6, A8, A10, A12, A14, A16, A18, A20, A22, A24, A26, A28 and A30 applicable to each aspheric surface S1 to S14 in example 3, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 7.6991 | 0.3170 | 1.55 | 56.1 | −3.95 | −1.6566 |
| S2 | Aspheric | 1.6596 | 1.3865 | | | | −1.0000 |
| S3 | Aspheric | 2.3546 | 0.5034 | 1.64 | 21.8 | 18.42 | 0.2996 |
| S4 | Aspheric | 2.6933 | 0.6781 | | | | −0.8229 |
| STO | Spherical | Infinite | −0.0394 | | | | |
| S5 | Aspheric | 3.7769 | 0.9602 | 1.55 | 56.1 | 2.67 | 4.0774 |
| S6 | Aspheric | −2.1560 | 0.3594 | | | | −0.0295 |
| S7 | Aspheric | 80.6953 | 0.2450 | 1.68 | 19.2 | −9.71 | 1.1324 |
| S8 | Aspheric | 6.0775 | 0.3738 | | | | −99.0000 |
| S9 | Aspheric | −1.8563 | 0.5479 | 1.55 | 56.1 | −5.33 | −1.0000 |
| S10 | Aspheric | −5.6698 | 0.1000 | | | | −0.3035 |
| S11 | Aspheric | 1.4178 | 1.6310 | 1.52 | 64.0 | 1.99 | −13.3055 |
| S12 | Aspheric | −2.2904 | 0.1000 | | | | −0.5312 |
| S13 | Aspheric | 1.8579 | 0.3200 | 1.67 | 19.0 | −3.07 | −1.0000 |
| S14 | Aspheric | 0.9133 | 0.2911 | | | | −1.0000 |
| S15 | Spherical | Infinite | 0.2100 | 1.52 | 64.2 | | |
| S16 | Spherical | Infinite | 0.5600 | | | | |
| S17 | Spherical | Infinite | | | | | |

TABLE 8

| Surface number | A4 | A6 | A8 | A10 | A12 | A14 | A16 |
|---|---|---|---|---|---|---|---|
| S1 | 2.2467E−02 | −2.2715E−02 | 1.2377E−02 | −4.4583E−03 | 1.1057E−03 | −1.8882E−04 | 2.1859E−05 |
| S2 | 4.0664E−02 | −4.4967E−02 | 5.0226E−02 | −5.6722E−02 | 4.5005E−02 | −1.4474E−02 | −9.4492E−03 |
| S3 | 4.2184E−02 | 1.2077E−02 | −1.2233E−02 | 7.5562E−02 | −2.2303E−01 | 3.8735E−01 | −4.4904E−01 |
| S4 | 1.1313E−01 | 3.7476E−02 | −4.0620E−02 | 1.0441E+00 | −7.1342E+00 | 2.6532E+01 | −5.9305E+01 |
| S5 | −5.4210E−02 | 2.0476E+00 | −4.3131E+01 | 5.4866E+02 | −4.5583E+03 | 2.5693E+04 | −1.0004E+05 |
| S6 | −7.4495E−02 | −1.0497E−01 | 1.5379E+00 | −1.0750E+01 | 4.9068E+01 | −1.5557E+02 | 3.4905E+02 |
| S7 | −2.2695E−01 | −5.3678E−01 | 3.7920E+00 | −1.6710E+01 | 5.4912E+01 | −1.3176E+02 | 2.2633E+02 |
| S8 | −1.3689E−02 | −6.7057E−01 | 2.6770E+00 | −7.0727E+00 | 1.3941E+01 | −2.0461E+01 | 2.2031E+01 |
| S9 | 4.2254E−01 | −1.0271E+00 | 2.1292E+00 | −3.3835E+00 | 4.0922E+00 | −3.7433E+00 | 2.5379E+00 |
| S10 | 5.7681E−03 | −3.7573E−01 | 7.1900E−01 | −7.7640E−01 | 5.4284E−01 | −2.3237E−01 | 4.0847E−02 |
| S11 | 2.8598E−01 | −6.8979E−01 | 9.0695E−01 | −7.7473E−01 | 4.5250E−01 | −1.8572E−01 | 5.4292E−02 |
| S12 | 2.3025E−01 | −2.3973E−01 | 1.4577E−01 | −4.8230E−02 | 6.2424E−03 | 1.3888E−03 | −7.9533E−04 |
| S13 | −2.2949E−01 | −1.4229E−01 | 2.7378E−01 | −1.8388E−01 | 7.3159E−02 | −1.9195E−02 | 3.4390E−03 |
| S14 | −5.0687E−01 | 2.8318E−01 | −1.0648E−01 | 2.7352E−02 | −4.7712E−03 | 5.4831E−04 | −3.7688E−05 |

TABLE 9

| Surface number | A18 | A20 | A22 | A24 | A26 | A28 | A30 |
|---|---|---|---|---|---|---|---|
| S1 | −1.6480E−06 | 7.3473E−08 | −1.4173E−09 | −1.2884E−11 | 7.0734E−13 | 0.0000E+00 | 0.0000E+00 |
| S2 | 1.3895E−02 | −8.0992E−03 | 2.8459E−03 | −6.4759E−04 | 9.4421E−05 | −8.1019E−06 | 3.1348E−07 |
| S3 | 3.8718E−01 | −2.7295E−01 | 1.5804E−01 | −6.8022E−02 | 1.8237E−02 | −2.2018E−03 | 0.0000E+00 |
| S4 | 8.0095E+01 | −5.7447E+01 | 5.1664E+01 | 2.5542E+01 | −1.8910E+01 | 4.4678E+00 | 0.0000E+00 |
| S5 | 2.6929E+05 | −4.9205E+05 | 5.8250E+05 | −4.0301E+05 | 1.2371E+05 | 0.0000E+00 | 0.0000E+00 |
| S6 | −5.5541E+02 | 6.1553E+02 | −4.5275E+02 | 1.9872E+02 | −3.9349E+01 | 0.0000E+00 | 0.0000E+00 |
| S7 | −2.7227E+02 | 2.2110E+02 | −1.1274E+02 | 3.0202E+01 | −1.5830E+00 | −7.1457E−01 | 0.0000E+00 |
| S8 | −1.7039E+01 | 9.1675E+00 | −3.2462E+00 | 6.7859E−01 | −6.3332E−02 | 0.0000E+00 | 0.0000E+00 |
| S9 | −1.2379E+00 | 4.1739E−01 | −9.1174E−02 | 1.1290E−02 | −5.1547E−04 | −1.6820E−05 | 0.0000E+00 |

TABLE 9-continued

| Surface number | A18 | A20 | A22 | A24 | A26 | A28 | A30 |
|---|---|---|---|---|---|---|---|
| S10 | 1.3037E−02 | −9.7421E−03 | 2.4914E−03 | −3.0287E−04 | 1.4448E−05 | 0.0000E+00 | 0.0000E+00 |
| S11 | −1.1335E−02 | 1.6754E−03 | −1.7115E−04 | 1.1488E−05 | −4.5583E−07 | 8.1021E−09 | 0.0000E+00 |
| S12 | 1.6830E−04 | −1.9905E−05 | 1.3284E−06 | −4.0669E−08 | −1.2076E−10 | 2.7818E−11 | 0.0000E+00 |
| S13 | −4.2167E−04 | 3.4407E−05 | −1.7240E−06 | 4.1337E−08 | 1.5066E−10 | −2.1376E−11 | 0.0000E+00 |
| S14 | 9.5314E−07 | 6.9465E−08 | −7.2705E−09 | 2.6384E−10 | −3.5876E−12 | −1.2881E−15 | 0.0000E+00 |

Figure 6A:
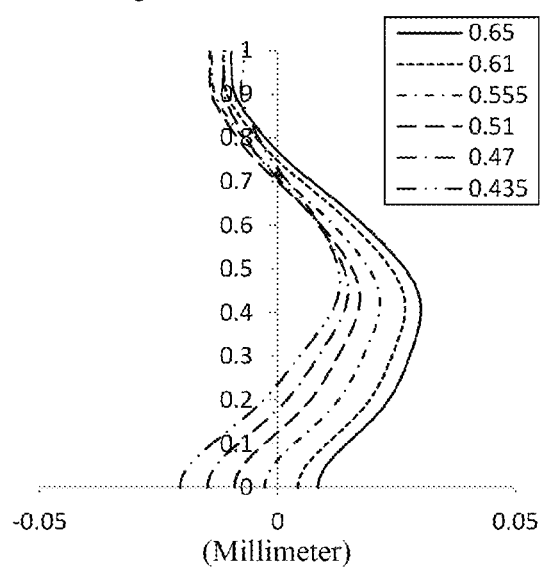
FIGS. 6A to 6D illustrate longitudinal aberration curves, astigmatic curves, a distortion curve, and a lateral color curve of the camera lens group of the example 3, respectively.
Figure 6B:
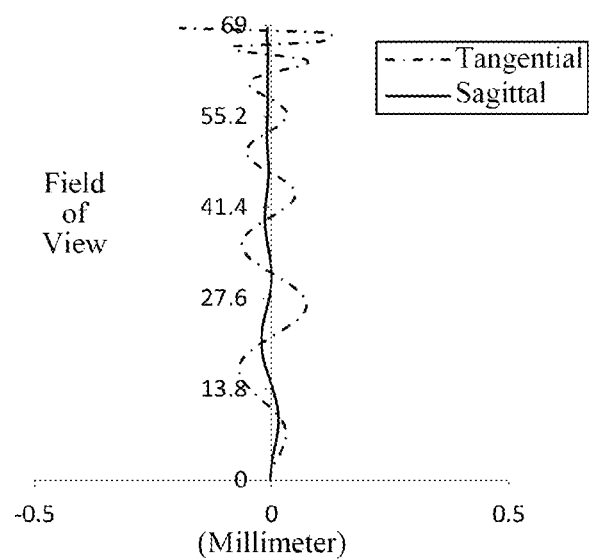
Figures 6C, 6D:
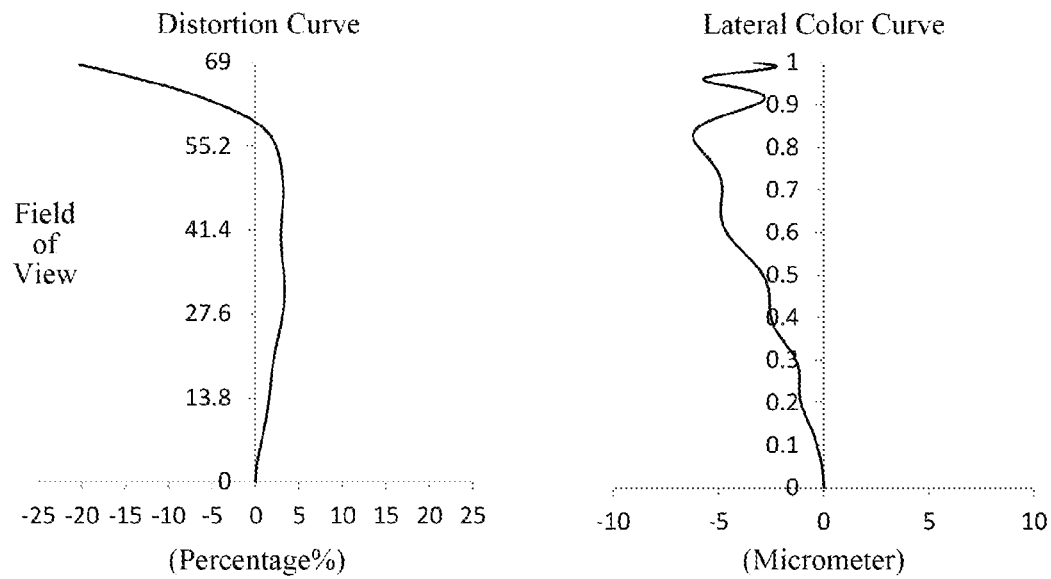

FIG. 6A illustrates longitudinal aberration curves of the camera lens group according to example 3, representing the deviations of focal points converged by light of different wavelengths after passing through the lens group. FIG. 6B illustrates astigmatic curves of the camera lens group according to example 3, representing the curvatures of a tangential plane and the curvatures of a sagittal plane. FIG. 6C illustrates a distortion curve of the camera lens group according to example 3, representing the amounts of distortion corresponding to different field-of-views. FIG. 6D illustrates a lateral color curve of the camera lens group according to example 3, representing the deviations of different image heights on an imaging plane after light passes through the lens group. It can be seen from FIG. 6A to FIG. 6D that the camera lens group provided in example 3 may achieve good image quality.

Example 4

Figure 7:
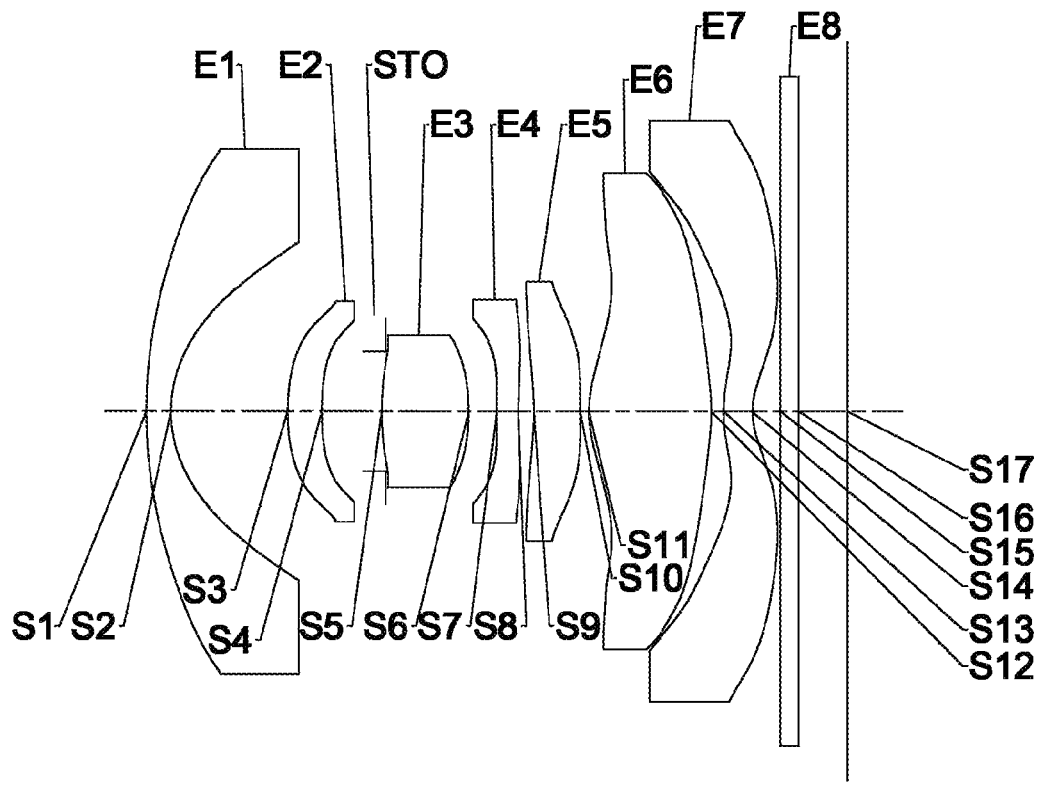
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the camera lens group is 2.03 mm, a total length TTL of the camera lens group is 8.00 mm, half of a diagonal length ImgH of an effective pixel area on the imaging plane S17 of the camera lens group is 4.20 mm, an aperture value Fno of the camera lens group is 2.21, and half of a maximum field-of-view Semi-FOV of the camera lens group is 67.67°.

Table 10 illustrates basic parameters of the camera lens group of example 4, wherein the units for the radius of curvature, the thickness/distance and the focal length are millimeter (mm). Table 11 and Table 12 show high-order coefficients A4, A6, A8, A10, A12, A14, A16, A18, A20, A22, A24, A26, A28 and A30 applicable to each aspheric surface S1 to S14 in example 4, wherein the surface shape of each aspheric surface may be defined by the formula (1) given in the above example 1.

TABLE 10

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 6.3085 | 0.2800 | 1.55 | 56.1 | −3.72 | 0.3772 |
| S2 | Aspheric | 1.5128 | 1.3310 | | | | −1.0000 |
| S3 | Aspheric | 2.4756 | 0.3911 | 1.61 | 25.7 | 11.67 | 0.6913 |
| S4 | Aspheric | 3.5684 | 0.7280 | | | | −1.5805 |
| STO | Spherical | Infinite | −0.0432 | | | | |
| S5 | Aspheric | 3.4941 | 0.9922 | 1.55 | 56.1 | 2.78 | 6.2888 |
| S6 | Aspheric | −2.4087 | 0.3197 | | | | 0.2708 |
| S7 | Aspheric | 28.5484 | 0.2450 | 1.68 | 19.2 | −8.62 | 2.4784 |
| S8 | Aspheric | 4.8310 | 0.1788 | | | | −1.0000 |
| S9 | Aspheric | −3.2494 | 0.5277 | 1.55 | 56.1 | −4.80 | −0.4920 |
| S10 | Aspheric | 14.2532 | 0.1003 | | | | −0.8686 |
| S11 | Aspheric | 1.3432 | 1.3988 | 1.52 | 64.0 | 1.85 | −0.9977 |
| S12 | Aspheric | −2.1452 | 0.1385 | | | | −0.9412 |
| S13 | Aspheric | 1.7633 | 0.3300 | 1.66 | 19.0 | −2.90 | −1.0545 |
| S14 | Aspheric | 0.8552 | 0.3163 | | | | −1.0057 |
| S15 | Spherical | Infinite | 0.2100 | 1.52 | 64.2 | | |
| S16 | Spherical | Infinite | 0.5597 | | | | |
| S17 | Spherical | Infinite | | | | | |

TABLE 11

| Surface number | A4 | A6 | A8 | A10 | A12 | A14 | A16 |
|---|---|---|---|---|---|---|---|
| S1 | 1.7534E−02 | −1.6792E−02 | 9.3275E−03 | −3.1759E−03 | 5.8474E−04 | −1.5958E−05 | −1.9399E−05 |
| S2 | 3.9712E−02 | −3.5759E−02 | 4.7755E−02 | −4.7103E−02 | 1.8345E−02 | 2.9883E−02 | −5.8479E−02 |
| S3 | 5.0932E−02 | 7.2339E−02 | −2.7643E−01 | 1.3033E+00 | −3.9577E+00 | 8.1160E+00 | −1.1542E+01 |
| S4 | 1.2671E−01 | −3.7409E−02 | 1.1506E+00 | −7.3926E+00 | 3.1260E+01 | −9.0086E+01 | 1.8243E+02 |
| S5 | −6.0828E−02 | 1.9826E+00 | −4.2081E+01 | 5.3989E+02 | −4.5380E+03 | 2.5939E+04 | −1.0263E+05 |
| S6 | −8.5809E−02 | −3.2870E−02 | 6.9584E−01 | −4.8923E+00 | 2.1052E+01 | −6.2502E+01 | 1.3236E+02 |
| S7 | −2.7579E−01 | −1.4053E−01 | 2.4148E−01 | 3.9534E+00 | −2.6343E+01 | 8.8089E+01 | −1.8747E+02 |
| S8 | −6.8644E−02 | −5.3124E−01 | 1.9558E+00 | −4.0144E+00 | 5.3795E+00 | −4.6664E+00 | 2.3816E+00 |
| S9 | 2.7851E−01 | −7.7425E−01 | 1.9020E+00 | −3.2230E+00 | 3.6491E+00 | −2.7882E+00 | 1.4440E+00 |
| S10 | −2.6629E−01 | −4.2630E−01 | 5.9933E−01 | −1.0613E+00 | 1.1122E+00 | −7.7491E−01 | 3.5603E−01 |
| S11 | −2.8490E−01 | 1.9408E−01 | −1.0520E−01 | 3.8825E−02 | −1.0041E−02 | 1.8788E−03 | −2.4159E−04 |
| S12 | 4.2675E−01 | −7.3677E−01 | 8.5014E−01 | −6.6986E−01 | 3.7592E−01 | −1.5559E−01 | 4.8491E−02 |
| S13 | −1.4077E−01 | −4.1140E−01 | 6.6428E−01 | −4.9945E−01 | 2.2832E−01 | −6.7689E−02 | 1.3056E−02 |
| S14 | −5.9227E−01 | 4.2547E−01 | −2.4174E−01 | 1.1178E−01 | −4.1898E−02 | 1.2330E−02 | −2.7563E−03 |

TABLE 12

| Surface number | A18 | A20 | A22 | A24 | A26 | A28 | A30 |
|---|---|---|---|---|---|---|---|
| S1 | 5.1230E−06 | −6.6985E−07 | 5.0721E−08 | −2.1263E−09 | 3.8391E−11 | 0.0000E+00 | 0.0000E+00 |
| S2 | 5.0827E−02 | −2.7429E−02 | 9.9193E−03 | −2.4333E−03 | 3.9225E−04 | −3.7730E−05 | 1.6458E−06 |
| S3 | 1.1662E+01 | −8.6123E+00 | 4.8335E+00 | −2.1281E+00 | 7.1036E−01 | −1.5546E−01 | 1.6065E−02 |
| S4 | −2.6316E+02 | 2.7087E+02 | −1.9627E+02 | 9.6032E+01 | −2.8761E+01 | 4.0226E+00 | 0.0000E+00 |
| S5 | 2.8120E+05 | −5.2383E+05 | 6.3307E+05 | −4.4767E+05 | 1.4061E+05 | 0.0000E+00 | 0.0000E+00 |
| S6 | −2.0301E+02 | 2.2267E+02 | −1.6589E+02 | 7.4754E+01 | −1.5240E+01 | 0.0000E+00 | 0.0000E+00 |
| S7 | 2.6824E+02 | −2.5871E+02 | 1.6192E+02 | −5.9505E+01 | 9.7531E+00 | 0.0000E+00 | 0.0000E+00 |
| S8 | −4.0200E−01 | −3.1135E−01 | 2.3822E−01 | −6.9041E−02 | 7.8659E−03 | 0.0000E+00 | 0.0000E+00 |
| S9 | −4.9940E−01 | 1.1029E−01 | −1.4061E−02 | 7.8930E−04 | 0.0000E+00 | 0.0000E+00 | 0.0000E+00 |
| S10 | −9.8646E−02 | 1.1897E−02 | 1.1354E−03 | −5.1128E−04 | 4.4005E−05 | 0.0000E+00 | 0.0000E+00 |
| S11 | 1.8503E−05 | −6.1922E−07 | 0.0000E+00 | 0.0000E+00 | 0.0000E+00 | 0.0000E+00 | 0.0000E+00 |
| S12 | −1.1452E−02 | 2.0362E−03 | −2.6756E−04 | 2.5131E−05 | −1.5926E−06 | 6.0911E−08 | −1.0606E−09 |
| S13 | −1.5361E−03 | 7.9914E−05 | 4.4677E−06 | −1.0207E−06 | 6.5174E−08 | −1.5423E−09 | 0.0000E+00 |
| S14 | 4.5768E−04 | −5.5538E−05 | 4.8363E−06 | −2.9355E−07 | 1.1779E−08 | −2.8078E−10 | 3.0114E−12 |

Figure 8A:
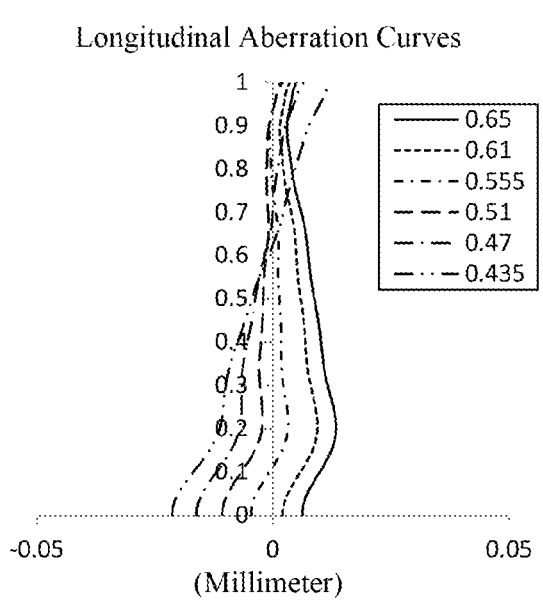
FIGS. 8A to 8D illustrate longitudinal aberration curves, astigmatic curves, a distortion curve, and a lateral color curve of the camera lens group of the example 4, respectively.
Figure 8B:
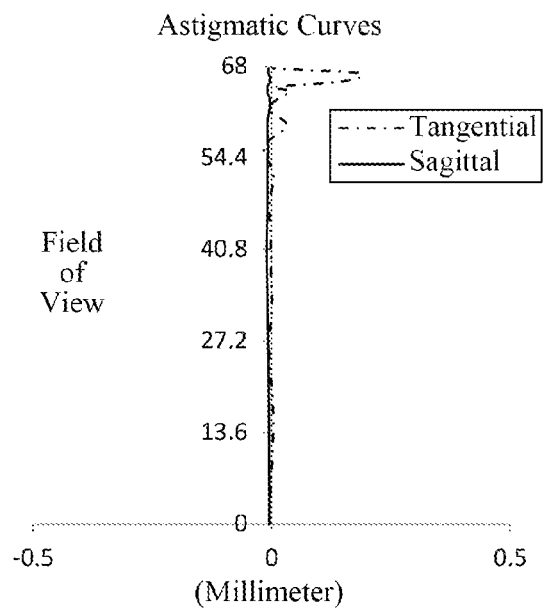
Figure 8C:
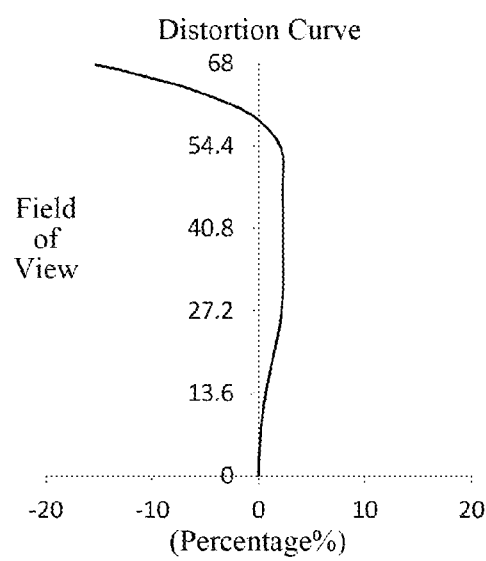
Figure 8D:
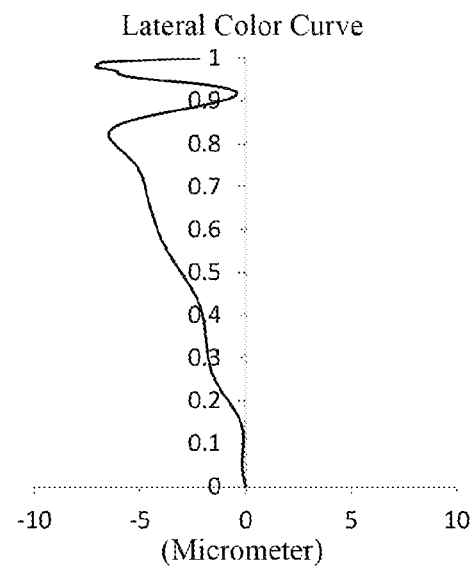

FIG. 8A illustrates longitudinal aberration curves of the camera lens group according to example 4, representing the deviations of focal points converged by light of different wavelengths after passing through the lens group. FIG. 8B illustrates astigmatic curves of the camera lens group according to example 4, representing the curvatures of a tangential plane and the curvatures of a sagittal plane. FIG. 8C illustrates a distortion curve of the camera lens group according to example 4, representing the amounts of distortion corresponding to different field-of-views. FIG. 8D illustrates a lateral color curve of the camera lens group according to example 4, representing the deviations of different image heights on an imaging plane after light passes through the lens group. It can be seen from FIG. 8A to FIG. 8D that the camera lens group provided in example 4 may achieve good image quality.

Example 5

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the camera lens group is 1.96 mm, a total length TTL of the camera lens group is 7.89 mm, half of a diagonal length ImgH of an effective pixel area on the imaging plane S17 of the camera lens group is 4.20 mm, an aperture value Fno of the camera lens group is 2.21, and half of a maximum field-of-view Semi-FOV of the camera lens group is 67.29°.

Table 13 illustrates basic parameters of the camera lens group of example 5, wherein the units for the radius of curvature, the thickness/distance and the focal length are millimeter (mm). Table 14 and Table 15 show high-order coefficients A4, A6, A8, A10, A12, A14, A16, A18, A20, A22, A24, A26, A28 and A30 applicable to each aspheric surface S1 to S14 in example 5, wherein the surface shape of each aspheric surface may be defined by the formula (1) given in the above example 1.

TABLE 13

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 5.3147 | 0.2808 | 1.55 | 56.1 | −3.54 | 0.3193 |
| S2 | Aspheric | 1.3916 | 1.3202 | | | | −1.0000 |
| S3 | Aspheric | 2.3742 | 0.3949 | 1.61 | 25.6 | 10.23 | 0.7908 |
| S4 | Aspheric | 3.5852 | 0.7141 | | | | −1.7113 |
| STO | Spherical | Infinite | −0.0397 | | | | |
| S5 | Aspheric | 3.4068 | 1.0197 | 1.55 | 56.1 | 2.83 | 7.7104 |
| S6 | Aspheric | −2.5237 | 0.3075 | | | | 0.6003 |
| S7 | Aspheric | 44.6806 | 0.2459 | 1.68 | 19.2 | −8.60 | 2.6012 |
| S8 | Aspheric | 5.1424 | 0.1279 | | | | −1.0000 |
| S9 | Aspheric | −3.9217 | 0.5606 | 1.55 | 56.1 | −5.32 | 0.5716 |
| S10 | Aspheric | 11.7651 | 0.1049 | | | | −0.1439 |
| S11 | Aspheric | 1.3360 | 1.3109 | 1.52 | 63.3 | 1.92 | −1.0000 |
| S12 | Aspheric | −2.5792 | 0.1001 | | | | −1.0000 |
| S13 | Aspheric | 1.5149 | 0.3310 | 1.67 | 19.0 | −3.40 | −1.0000 |
| S14 | Aspheric | 0.8329 | 0.3391 | | | | |
| S15 | Spherical | Infinite | 0.2100 | 1.52 | 64.2 | | |
| S16 | Spherical | Infinite | 0.5578 | | | | |
| S17 | Spherical | Infinite | | | | | |

TABLE 14

| Surface number | A4 | A6 | A8 | A10 | A12 | A14 | A16 |
|---|---|---|---|---|---|---|---|
| S1 | −4.9640E−03 | −1.5195E−03 | 4.5978E−03 | −3.5151E−03 | 1.5055E−03 | −4.1886E−04 | 7.9816E−05 |
| S2 | 1.9533E−02 | −5.5286E−02 | 1.5397E−01 | −2.3734E−01 | 2.3958E−01 | −1.5361E−01 | 5.1973E−02 |
| S3 | 4.5126E−02 | 5.3797E−02 | 4.6917E−02 | −6.3578E−01 | 3.1431E+00 | −9.1188E+00 | 1.7361E+01 |
| S4 | 1.2039E−01 | 8.1352E−03 | 9.5809E−01 | −6.9116E+00 | 3.1831E+01 | −9.9408E+01 | 2.1889E+02 |
| S5 | −7.8911E−02 | 2.5029E+00 | −5.6010E+01 | 7.5716E+02 | −6.7021E+03 | 4.0318E+04 | −1.6780E+05 |
| S6 | −8.9600E−02 | 1.8232E−03 | −1.7095E−01 | 2.5188E+00 | −1.9906E+01 | 9.4162E+01 | −2.8863E+02 |
| S7 | −2.7426E−01 | −8.3243E−02 | −3.0877E−01 | 5.2896E+00 | −2.6287E+01 | 8.0077E+01 | −1.6775E+02 |
| S8 | −6.6050E−03 | −7.2687E−01 | 2.2173E+00 | −3.9205E+00 | 4.4921E+00 | −3.3359E+00 | 1.5459E+00 |
| S9 | 3.2604E−01 | −1.0508E+00 | 2.5564E+00 | −4.0805E+00 | 4.2644E+00 | −2.9459E+00 | 1.3349E+00 |
| S10 | −3.2102E−01 | 1.3095E−01 | 5.4715E−02 | −3.8396E−02 | −7.9068E−02 | 1.5305E−01 | −1.4910E−01 |
| S11 | −3.1431E−01 | 3.1200E−01 | −3.8931E−01 | 4.2030E−01 | −3.3217E−01 | 1.8641E−01 | −7.5143E−02 |
| S12 | 2.6010E−01 | −2.2705E−01 | 3.9524E−02 | 1.2271E−01 | −1.5120E−01 | 9.6335E−02 | −4.0457E−02 |
| S13 | −2.9277E−01 | −4.3253E−02 | 2.2122E−01 | −1.8441E−01 | 8.5781E−02 | −2.5733E−02 | 5.2158E−03 |
| S14 | −6.2328E−01 | 4.7750E−01 | −2.8717E−01 | 1.3438E−01 | −4.8129E−02 | 1.2890E−02 | −2.5285E−03 |

TABLE 15

| Surface number | A18 | A20 | A22 | A24 | A26 | A28 | A30 |
|---|---|---|---|---|---|---|---|
| S1 | −1.0565E−05 | 9.5891E−07 | −5.7056E−08 | 2.0065E−09 | −3.1605E−11 | 0.0000E+00 | 0.0000E+00 |
| S2 | 2.3987E−03 | −1.1786E−02 | 6.0983E−03 | −1.7091E−03 | 2.8851E−04 | −2.7928E−05 | 1.2094E−06 |
| S3 | −2.2577E+01 | 2.0486E+01 | −1.3160E+01 | 6.0597E+00 | −1.9963E+00 | 4.3649E−01 | −4.7123E−02 |
| S4 | −3.4329E+02 | 3.8105E+02 | −2.9221E+02 | 1.4707E+02 | −4.3776E+01 | 5.8818E+00 | 0.0000E+00 |
| S5 | 4.8346E+05 | −9.4671E+05 | 1.2026E+06 | −8.9387E+05 | 2.9512E+05 | 0.0000E+00 | 0.0000E+00 |
| S6 | 5.8720E+02 | −7.8966E+02 | 6.7631E+02 | −3.3488E+02 | 7.3095E+01 | 0.0000E+00 | 0.0000E+00 |
| S7 | 2.4773E+02 | −2.5427E+02 | 1.7231E+02 | −6.9048E+01 | 1.2343E+01 | 0.0000E+00 | 0.0000E+00 |
| S8 | −4.0637E−01 | 4.6347E−02 | 0.0000E+00 | 0.0000E+00 | 0.0000E+00 | 0.0000E+00 | 0.0000E+00 |
| S9 | −3.8131E−01 | 6.2134E−02 | −4.3882E−03 | 0.0000E+00 | 0.0000E+00 | 0.0000E+00 | 0.0000E+00 |
| S10 | 9.5759E−02 | −3.9970E−02 | 1.0210E−02 | −1.4394E−03 | 8.5634E−05 | 0.0000E+00 | 0.0000E+00 |
| S11 | 2.2071E−02 | −4.7485E−03 | 7.4292E−04 | −8.2515E−05 | 6.1817E−06 | −2.8061E−07 | 5.8350E−09 |
| S12 | 1.1961E−02 | −2.5363E−03 | 3.8368E−04 | −4.0366E−05 | 2.8010E−06 | −1.1506E−07 | 2.1160E−09 |
| S13 | −7.2283E−04 | 6.7554E−05 | −4.0672E−06 | 1.4202E−07 | −2.1743E−09 | 0.0000E+00 | 0.0000E+00 |
| S14 | 3.5651E−04 | −3.5307E−05 | 2.3629E−06 | −9.9004E−08 | 2.1395E−09 | −6.2252E−12 | −4.2131E−13 |

FIG. 10A illustrates longitudinal aberration curves of the camera lens group according to example 5, representing the deviations of focal points converged by light of different wavelengths after passing through the lens group. FIG. 10B illustrates astigmatic curves of the camera lens group according to example 5, representing the curvatures of a tangential plane and the curvatures of a sagittal plane. FIG. 10C illustrates a distortion curve of the camera lens group according to example 5, representing the amounts of distortion corresponding to different field-of-views. FIG. 10D illustrates a lateral color curve of the camera lens group according to example 5, representing the deviations of different image heights on an imaging plane after light passes through the lens group. It can be seen from FIG. 10A to FIG. 10D that the camera lens group provided in example 5 may achieve good image quality.

Example 6

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is concave, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the camera lens group is 1.95 mm, a total length TTL of the camera lens group is 7.84 mm, half of a diagonal length ImgH of an effective pixel area on the imaging plane S17 of the camera lens group is 4.20 mm, an aperture value Fno of the camera lens group is 2.21, and half of a maximum field-of-view Semi-FOV of the camera lens group is 66.75°.

Table 16 illustrates basic parameters of the camera lens group of example 6, wherein the units for the radius of curvature, the thickness/distance and the focal length are millimeter (mm). Table 17 and Table 18 show high-order coefficients A4, A6, A8, A10, A12, A14, A16, A18, A20, A22, A24, A26, A28 and A30 applicable to each aspheric surface S1 to S14 in example 6, wherein the surface shape of each aspheric surface may be defined by the formula (1) given in the above example 1.

TABLE 16

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 5.6956 | 0.2800 | 1.55 | 56.1 | −3.43 | 0.1207 |
| S2 | Aspheric | 1.3841 | 1.3096 | | | | −1.0000 |
| S3 | Aspheric | 2.2338 | 0.4213 | 1.60 | 26.1 | 9.51 | 0.8428 |
| S4 | Aspheric | 3.3810 | 0.6824 | | | | −1.7236 |
| STO | Spherical | Infinite | −0.0423 | | | | |
| S5 | Aspheric | 3.2406 | 1.1151 | 1.55 | 56.1 | 2.84 | 8.7828 |
| S6 | Aspheric | −2.6130 | 0.2901 | | | | 0.7569 |
| S7 | Aspheric | −26.3259 | 0.2450 | 1.68 | 19.2 | −9.40 | 2.5783 |
| S8 | Aspheric | 8.4320 | 0.1075 | | | | −1.0000 |
| S9 | Aspheric | −4.6609 | 0.5609 | 1.55 | 56.1 | −4.62 | 2.8263 |
| S10 | Aspheric | 5.7364 | 0.1000 | | | | 0.2248 |
| S11 | Aspheric | 1.2107 | 1.2525 | 1.52 | 64.0 | 1.79 | −11.1206 |
| S12 | Aspheric | −2.5336 | 0.1142 | | | | −0.9706 |
| S13 | Aspheric | 1.6608 | 0.3300 | 1.66 | 19.9 | −2.95 | −1.0000 |
| S14 | Aspheric | 0.8285 | 0.3228 | | | | −1.0000 |
| S15 | Spherical | Infinite | 0.2100 | 1.52 | 64.2 | | |
| S16 | Spherical | Infinite | 0.5407 | | | | |
| S17 | Spherical | Infinite | | | | | |

TABLE 17

| Surface number | A4 | A6 | A8 | A10 | A12 | A14 | A16 |
|---|---|---|---|---|---|---|---|
| S1 | −6.9978E−03 | 5.4645E−03 | −1.8104E−03 | 1.8877E−04 | 6.4072E−05 | −3.3871E−05 | 8.4896E−06 |
| S2 | 8.6802E−03 | −8.7989E−03 | 2.6136E−02 | 7.0849E−03 | −8.0950E−02 | 1.4328E−01 | −1.4736E−01 |
| S3 | 4.2278E−02 | 1.5442E−04 | 4.5374E−01 | −2.4153E+00 | 8.1168E+00 | −1.7858E+01 | 2.5979E+01 |
| S4 | 1.2230E−01 | 3.1972E−03 | 1.0096E+00 | −7.0094E+00 | 3.2381E+01 | −1.0354E+02 | 2.3670E+02 |

TABLE 17-continued

| Surface number | A4 | A6 | A8 | A10 | A12 | A14 | A16 |
|---|---|---|---|---|---|---|---|
| S5 | −7.9710E−02 | 2.1925E+00 | −4.8531E+01 | 6.4652E+02 | −5.6402E+03 | 3.3421E+04 | −1.3695E+05 |
| S6 | −9.5568E−02 | −1.4419E−01 | 1.5541E+00 | −1.2282E+01 | 6.4688E+01 | −2.3513E+02 | 5.9216E+02 |
| S7 | −2.0823E−01 | −4.4869E−01 | 1.1665E+00 | −3.7652E−01 | −6.8914E+00 | 2.5456E+01 | −5.3454E+01 |
| S8 | 1.4996E−01 | −1.2738E+00 | 3.3522E+00 | −5.4014E+00 | 5.7132E+00 | −3.9708E+00 | 1.7475E+00 |
| S9 | 4.1657E−01 | −1.3943E+00 | 3.0258E+00 | −4.2551E+00 | 3.9573E+00 | −2.4489E+00 | 9.9317E−01 |
| S10 | −3.2204E−01 | −1.4290E−01 | 7.9125E−01 | −1.0768E+00 | 7.1208E−01 | −3.3480E−02 | −3.7051E−01 |
| S11 | 2.5931E−01 | −6.6469E−01 | 7.4589E−01 | −4.9482E−01 | 2.0688E−01 | −5.6027E−02 | 9.8413E−03 |
| S12 | 5.1411E−01 | −8.5779E−01 | 8.6855E−01 | −5.1845E−01 | 1.5518E−01 | 4.7490E−03 | −2.4012E−02 |
| S13 | −1.5731E−01 | −5.4601E−01 | 1.0440E+00 | −9.2582E−01 | 4.9860E−01 | −1.7609E−01 | 4.2002E−02 |
| S14 | −7.0262E−01 | 5.5629E−01 | −2.9367E−01 | 9.4352E−02 | −1.3732E−02 | −2.0324E−03 | 1.5514E−03 |

TABLE 18

| Surface number | A18 | A20 | A22 | A24 | A26 | A28 | A30 |
|---|---|---|---|---|---|---|---|
| S1 | −1.3978E−06 | 1.5527E−07 | −1.1116E−08 | 4.5998E−10 | −8.3182E−12 | 0.0000E+00 | 0.0000E+00 |
| S2 | 1.0188E−01 | −4.9619E−02 | 1.7207E−02 | −4.1836E−03 | 6.8044E−04 | −6.6610E−05 | 2.9676E−06 |
| S3 | −2.4207E+01 | 1.2755E+01 | −1.5832E+00 | −2.4178E+00 | 1.6056E+00 | −4.1739E−01 | 4.1368E−02 |
| S4 | −3.8984E+02 | 4.5888E+02 | −3.7611E+02 | 2.0350E+02 | −6.5391E+01 | 9.5044E+00 | 0.0000E+00 |
| S5 | 3.8841E+05 | −7.4885E+05 | 9.3709E+05 | −6.8677E+05 | 2.2385E+05 | 0.0000E+00 | 0.0000E+00 |
| S6 | −1.0285E+03 | 1.2073E+03 | −9.1361E+02 | 4.0193E+02 | −7.8050E+01 | 0.0000E+00 | 0.0000E+00 |
| S7 | 7.8730E+01 | −8.3928E+01 | 6.1438E+01 | −2.7229E+01 | 5.4432E+00 | 0.0000E+00 | 0.0000E+00 |
| S8 | −4.4241E−01 | 4.9245E−02 | 0.0000E+00 | 0.0000E+00 | 0.0000E+00 | 0.0000E+00 | 0.0000E+00 |
| S9 | −2.5129E−01 | 3.5390E−02 | −2.0559E−03 | 0.0000E+00 | 0.0000E+00 | 0.0000E+00 | 0.0000E+00 |
| S10 | 3.4453E−01 | −1.6057E−01 | 4.2743E−02 | −6.1813E−03 | 3.7772E−04 | 0.0000E+00 | 0.0000E+00 |
| S11 | −1.0847E−03 | 6.8273E−05 | −1.8738E−06 | 0.0000E+00 | 0.0000E+00 | 0.0000E+00 | 0.0000E+00 |
| S12 | 1.0491E−02 | −2.5395E−03 | 3.9312E−04 | −3.9837E−05 | 2.5639E−06 | −9.5219E−08 | 1.5541E−09 |
| S13 | −6.7932E−03 | 7.3043E−04 | −4.9534E−05 | 1.8917E−06 | −3.2576E−08 | 4.5383E−10 | −2.4181E−11 |
| S14 | −3.9852E−04 | 6.1879E−05 | −6.3623E−06 | 4.3724E−07 | −1.9368E−08 | 5.0080E−10 | −5.7463E−12 |

Figure 12A:
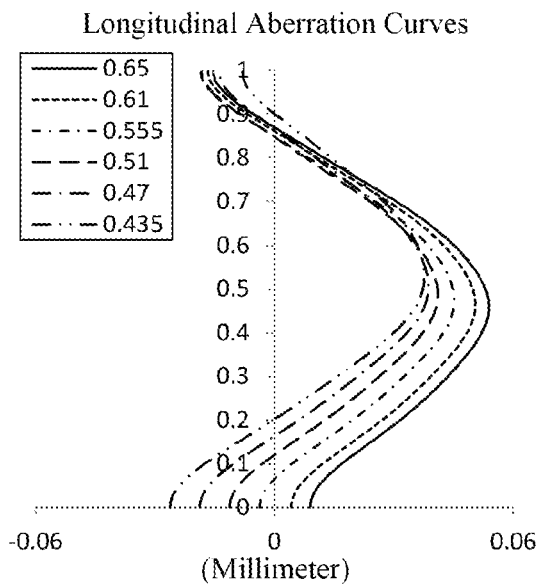
FIGS. 12A to 12D illustrate longitudinal aberration curves, astigmatic curves, a distortion curve, and a lateral color curve of the camera lens group of the example 6, respectively.
Figure 12B:
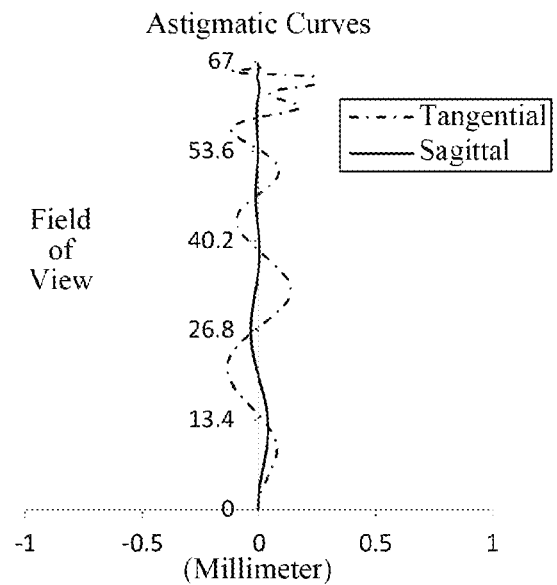
Figure 12C:
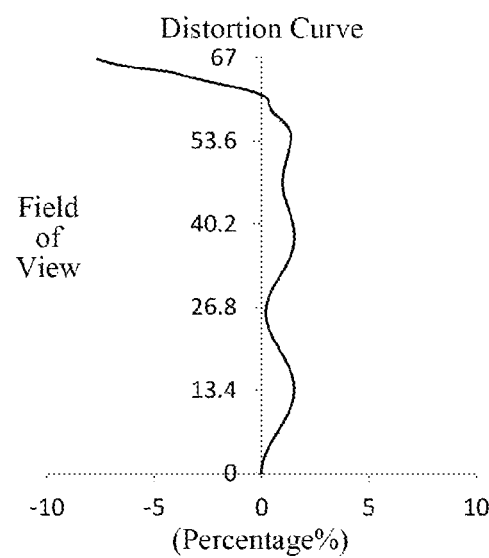
Figure 12D:
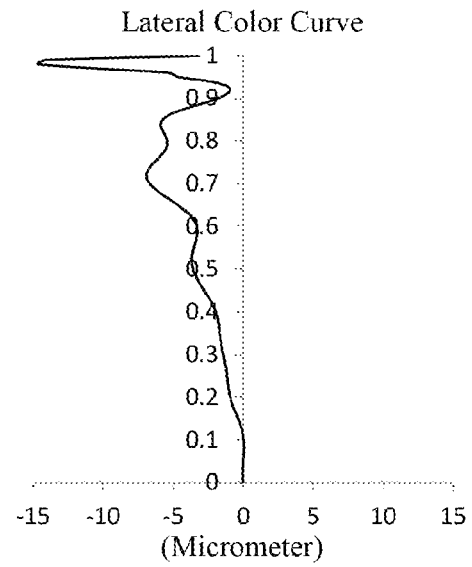

FIG. 12A illustrates longitudinal aberration curves of the camera lens group according to example 6, representing the deviations of focal points converged by light of different wavelengths after passing through the lens group. FIG. 12B illustrates astigmatic curves of the camera lens group according to example 6, representing the curvatures of a tangential plane and the curvatures of a sagittal plane. FIG. 12C illustrates a distortion curve of the camera lens group according to example 6, representing the amounts of distortion corresponding to different field-of-views. FIG. 12D illustrates a lateral color curve of the camera lens group according to example 6, representing the deviations of different image heights on an imaging plane after light passes through the lens group. It can be seen from FIG. 12A to FIG. 12D that the camera lens group provided in example 6 may achieve good image quality.

In view of the above, examples 1 to 6 respectively satisfy the relationship shown in Table 19.

TABLE 19

| Conditional/ Example | 1 | 2 | 3 | 4 | 5 | 6 |
|---|---|---|---|---|---|---|
| FOV (°) | 134.88 | 136.92 | 137.10 | 135.34 | 134.58 | 133.49 |
| f4/f1 | 2.06 | 4.21 | 2.46 | 2.32 | 2.43 | 2.74 |
| f34/BFL | 3.63 | 3.05 | 3.13 | 3.33 | 3.36 | 3.41 |
| (R3 + R5)/ (R5 − R3) | 2.24 | 2.59 | 4.31 | 5.86 | 5.60 | 5.44 |
| (f23 + R5)/ (R5 + f23) | 2.36 | 3.27 | 5.74 | 6.48 | 6.97 | 8.35 |
| (f1 + R6)/ (f1 − R6) | 2.26 | 2.65 | 3.41 | 4.67 | 5.95 | 7.42 |
| CT6/T45 | 3.65 | 4.21 | 4.36 | 7.82 | 10.25 | 11.65 |

TABLE 19-continued

| Conditional/ Example | 1 | 2 | 3 | 4 | 5 | 6 |
|---|---|---|---|---|---|---|
| (SAG21 + SAG22)/ (SAG1 − SAG22) | 2.71 | 3.44 | 4.02 | 5.02 | 4.32 | 3.84 |
| (DT41 + DT42)/ (DT42 − DT41) | 8.40 | 10.25 | 9.11 | 10.53 | 11.73 | 7.74 |
| (DT31 + DT32)/ (DT32 − DT31) | 5.92 | 8.54 | 13.15 | 10.33 | 9.48 | 8.29 |
| ET1/ET2 | | | | | | |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
    a first lens having negative refractive power, a convex object-side surface and a concave image-side surface, the object-side surface and the image-side surface of the first lens being at or adjacent to the optical axis;
    a second lens having refractive power, a convex object-side surface and a concave image-side surface, the object-side surface and the image-side surface of the second lens being at or adjacent to the optical axis;
    a third lens having positive refractive power, a convex object-side surface and a convex image-side surface, the object-side surface and the image-side surface of the third lens being at or adjacent to the optical axis;
    a fourth lens having refractive power, the object-side surface and the image-side surface of the fourth lens being at or adjacent to the optical axis;
    a fifth lens having refractive power and a concave object-side surface, the object-side surface and the image-side surface of the fifth lens being at or adjacent to the optical axis;
    a sixth lens having positive refractive power, a convex object-side surface and a convex image-side surface, the object-side surface and the image-side surface of the sixth lens being at or adjacent to the optical axis; and
    a seventh lens having negative refractive power, the object-side surface and the image-side surface of the seventh lens being at or adjacent to the optical axis,
    wherein FOV>133.0°, where FOV is a maximum field-of-view of the camera lens group; and
    an amount of distortion of the camera lens group is below 25.0%.

2. The camera lens group according to claim 1, wherein $0.50 < f4/f1 < 4.50$,
    where f4 is an effective focal length of the fourth lens, and f1 is an effective focal length of the first lens.

3. The camera lens group according to claim 1, wherein $3.00 < f34/BFL < 4.50$,
    where f34 is a combined focal length of the third lens and the fourth lens, and BFL is a distance from an image-side surface of the seventh lens to an imaging plane of the camera lens group along the optical axis.

4. The camera lens group according to claim 1, wherein $2.00 < (R3+R5)/(R5-R3) < 6.00$,
    where R3 is a radius of curvature of the object-side surface of the second lens, and R5 is a radius of curvature of the object-side surface of the third lens.

5. The camera lens group according to claim 1, wherein $2.00 < (f23+R5)/(R5-f23) < 11.00$,
    where f23 is a combined focal length of the second lens and the third lens, and R5 is a radius of curvature of the object-side surface of the third lens.

6. The camera lens group according to claim 1, wherein $2.00 < (f1+R6)/(f1-R6) < 8.00$,
    where f1 is an effective focal length of the first lens, and R6 is a radius of curvature of the image-side surface of the third lens.

7. The camera lens group according to claim 1, wherein $3.00 < CT6/T45 < 12.00$,
    where CT6 is a center thickness of the sixth lens along the optical axis, and T45 is a spaced interval between the fourth lens and the fifth lens along the optical axis.

8. The camera lens group according to claim 1, wherein $2.00 < (SAG21+SAG22)/(SAG21-SAG22) < 6.00$,
    where SAG21 is a distance along the optical axis from an intersection of the object-side surface of the second lens and the optical axis to a vertex of an effective radius of the object-side surface of the second lens, and SAG22 is a distance along the optical axis from an intersection of the image-side surface of the second lens and the optical axis to a vertex of an effective radius of the image-side surface of the second lens.

9. The camera lens group according to claim 1, wherein $1.00 < ET1/ET2 < 9.00$,
    where ET1 is an edge thickness of the first lens, and ET2 is an edge thickness of the second lens.

10. The camera lens group according to claim 1, wherein $7.00 < (DT41+DT42)/(DT42-DT41) < 12.00$,
    where DT41 is a maximum effective radius of an object-side surface of the fourth lens, and DT42 is a maximum effective radius of an image-side surface of the fourth lens.

11. The camera lens group according to claim 1, wherein $5.00 < (DT31+DT32)/(DT32-DT31) < 14.00$,
    where DT31 is a maximum effective radius of the object-side surface of the third lens, and DT32 is a maximum effective radius of the image-side surface of the third lens.

12. The camera lens group according to claim 1, wherein $4.31 \leq (R3+R5)/(R5-R3) < 6.00$,
    where R3 is a radius of curvature of the object-side surface of the second lens, and R5 is a radius of curvature of the object-side surface of the third lens.

13. A camera lens group, sequentially from an object side to an image side of the camera lens group along an optical axis, comprising:
    a first lens having negative refractive power, a convex object-side surface and a concave image-side surface, the object-side surface and the image-side surface of the first lens being at or adjacent to the optical axis;
    a second lens having refractive power, a convex object-side surface and a concave image-side surface, the object-side surface and the image-side surface of the second lens being at or adjacent to the optical axis;
    a third lens having positive refractive power, a convex object-side surface and a convex image-side surface, the object-side surface and the image-side surface of the third lens being at or adjacent to the optical axis;
    a fourth lens having refractive power, the object-side surface and the image-side surface of the fourth lens being at or adjacent to the optical axis;
    a fifth lens having refractive power and a concave object-side surface, the object-side surface and the image-side surface of the fifth lens being at or adjacent to the optical axis;
    a sixth lens having positive refractive power, a convex object-side surface and a convex image-side surface, the object-side surface and the image-side surface of the sixth lens being at or adjacent to the optical axis; and
    a seventh lens having negative refractive power, the object-side surface and the image-side surface of the seventh lens being at or adjacent to the optical axis, wherein FOV>133.0° and $3.00 < f34/BFL < 4.50$, where FOV is a maximum field-of-view of the camera lens group, f34 is a combined focal length of the third lens and the fourth lens, and BFL is a distance from an image-side surface of the seventh lens to an imaging plane of the camera lens group along the optical axis; and an amount of distortion of the camera lens group is below 25.0%.

14. The camera lens group according to claim 13, wherein $0.50<f4/f1<4.50$,
where f4 is an effective focal length of the fourth lens, and f1 is an effective focal length of the first lens.

15. The camera lens group according to claim 13, wherein $2.00<(R3+R5)/(R5-R3)<6.00$,
where R3 is a radius of curvature of the object-side surface of the second lens, and R5 is a radius of curvature of the object-side surface of the third lens.

16. The camera lens group according to claim 13, wherein $2.00<(f23+R5)/(R5-f23)<11.00$,
where f23 is a combined focal length of the second lens and the third lens, and R5 is a radius of curvature of the object-side surface of the third lens.

17. The camera lens group according to claim 13, wherein $2.00<(f1+R6)/(f1-R6)<8.00$,
where f1 is an effective focal length of the first lens, and R6 is a radius of curvature of the image-side surface of the third lens.

18. The camera lens group according to claim 13, wherein $3.00<CT6/T45<12.00$,
where CT6 is a center thickness of the sixth lens along the optical axis, and T45 is a spaced interval between the fourth lens and the fifth lens along the optical axis.

19. The camera lens group according to claim 13, wherein $2.00<(SAG21+SAG22)/(SAG21-SAG22)<6.00$,
where SAG21 is a distance along the optical axis from an intersection of the object-side surface of the second lens and the optical axis to a vertex of an effective radius of the object-side surface of the second lens, and SAG22 is a distance along the optical axis from an intersection of the image-side surface of the second lens and the optical axis to a vertex of an effective radius of the image-side surface of the second lens.

* * * * *